United States Patent
Kita et al.

(10) Patent No.: US 10,073,306 B2
(45) Date of Patent: Sep. 11, 2018

(54) LCD DEVICE

(71) Applicant: Sharp Kabushiki Kaisha, Sakai, Osaka (JP)

(72) Inventors: Yuichi Kita, Sakai (JP); Tsuyoshi Okazaki, Sakai (JP); Hiroshi Tsuchiya, Sakai (JP); Kazuhito Matsumoto, Sakai (JP); Ken Kuboki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 49 days.

(21) Appl. No.: 15/306,118

(22) PCT Filed: Apr. 17, 2015

(86) PCT No.: PCT/JP2015/061828
§ 371 (c)(1),
(2) Date: Oct. 24, 2016

(87) PCT Pub. No.: WO2015/163255
PCT Pub. Date: Oct. 29, 2015

(65) Prior Publication Data
US 2017/0045787 A1    Feb. 16, 2017

(30) Foreign Application Priority Data

Apr. 25, 2014   (JP) ................. 2014-091600

(51) Int. Cl.
*G09G 3/36*   (2006.01)
*G02F 1/1343*   (2006.01)
(Continued)

(52) U.S. Cl.
CPC ........ *G02F 1/134327* (2013.01); *G02F 1/137* (2013.01); *G02F 1/1368* (2013.01);
(Continued)

(58) Field of Classification Search
CPC ......... G02F 1/134327; G02F 1/134363; G02F 1/1368; G02F 1/137; G02F 2001/133397;
(Continued)

(56) References Cited

U.S. PATENT DOCUMENTS 6,456,351 B1    9/2002   Kim et al.
2002/0149729 A1 *  10/2002  Nishimura ........ G02F 1/134363
                                                          349/141
(Continued)

FOREIGN PATENT DOCUMENTS

JP    2000-029072 A    1/2000
JP    2004-182986 A    7/2004
(Continued)

OTHER PUBLICATIONS

Official Communication issued in International Patent Application No. PCT/JP2015/061828, dated Jun. 16, 2015.

*Primary Examiner* — Dismery Mercedes
*Assistant Examiner* — Brent D Castiaux
(74) *Attorney, Agent, or Firm* — Keating & Bennett, LLP

(57) ABSTRACT

A liquid crystal display device (100) includes: a liquid crystal layer (42) held between a pair of substrates (10, 30), the liquid crystal layer containing one or more types of positive liquid crystal compounds whose dielectric anisotropy is positive and one or more types of negative liquid crystal compounds whose dielectric anisotropy is negative, a total content of the positive liquid crystal compounds not being smaller than a total content of the negative liquid crystal compounds; a pixel electrode (24) provided in the pair of substrates, the pixel electrode having a plurality of linear portions and a slit; and a common electrode (22) insulated from the pixel electrode, wherein the pixel electrode and the common electrode apply across the liquid crystal layer a pixel voltage of positive polarity and a pixel
(Continued)

voltage of negative polarity alternately at a frequency lower than 60 Hz.

17 Claims, 9 Drawing Sheets

(51) Int. Cl.
 *G02F 1/1368* (2006.01)
 *G02F 1/137* (2006.01)
 *G02F 1/1333* (2006.01)
(52) U.S. Cl.
 CPC ......... *G02F 1/134363* (2013.01); *G09G 3/36* (2013.01); *G02F 2001/13706* (2013.01); *G02F 2001/13712* (2013.01); *G02F 2001/133397* (2013.01); *G02F 2201/121* (2013.01); *G02F 2201/123* (2013.01); *G02F 2202/10* (2013.01)
(58) Field of Classification Search
 CPC . G02F 2001/13706; G02F 2001/13712; G02F 2201/123; G02F 2201/121; G02F 2202/10; G09G 3/36
 See application file for complete search history.

(56) References Cited

U.S. PATENT DOCUMENTS

| | | | |
|---|---|---|---|
| 2003/0017279 A1 | 1/2003 | Klasen-Memmer et al. | |
| 2006/0132413 A1* | 6/2006 | Chen | G09G 3/3406 345/94 |
| 2009/0310053 A1* | 12/2009 | Kanaya | G02F 1/134363 349/46 |
| 2010/0309419 A1 | 12/2010 | Oka et al. | |
| 2011/0012821 A1 | 1/2011 | Ogura et al. | |
| 2012/0138922 A1 | 6/2012 | Yamazaki et al. | |
| 2012/0261657 A1* | 10/2012 | Takahashi | H01L 29/7869 257/43 |
| 2013/0258222 A1* | 10/2013 | Kim | G02F 1/13439 349/33 |
| 2014/0125569 A1 | 5/2014 | Nakata et al. | |
| 2015/0177572 A1 | 6/2015 | Kita et al. | |
| 2016/0203780 A1 | 7/2016 | Kita | |

FOREIGN PATENT DOCUMENTS

| | | |
|---|---|---|
| JP | 2009-237414 A | 10/2009 |
| JP | 2010-002596 A | 1/2010 |
| JP | 2010-282037 A | 12/2010 |
| JP | 2011-169973 A | 9/2011 |
| JP | 2012-134475 A | 7/2012 |
| JP | 2013-147657 A | 8/2013 |
| WO | 2013/008668 A1 | 1/2013 |
| WO | 2014/017364 A1 | 1/2014 |
| WO | 2015/025772 A1 | 2/2015 |

\* cited by examiner (a)

(b)

(a)

(b)

LUMINANCE_min (a)

(b)

(a)

(b)

LCD DEVICE

TECHNICAL FIELD

The present invention relates to a liquid crystal display device and particularly to a transverse electric field mode TFT-type liquid crystal display device.

BACKGROUND ART

TFT-type liquid crystal display devices are configured to realize a display operation in such a manner that the voltage applied to the liquid crystal layer (which is electrically referred to as "liquid crystal capacitance") of each pixel is controlled via a TFT (thin film transistor), whereby the amount of light transmitted through the pixel is adjusted. The polarity of the voltage applied to the liquid crystal layer of each pixel is reversed every predetermined period. Such a driving method for liquid crystal display devices is called "alternate driving method", in which a DC voltage is not applied across the liquid crystal layer for a long time period. This is because, if a DC voltage is applied across the liquid crystal layer for a long time period, uneven distribution of ions that are present in a liquid crystal material (interfacial polarization) and deterioration of the liquid crystal material occur, so that the display quality deteriorates.

In this specification, the voltage applied to the liquid crystal layer (liquid crystal capacitance) of each pixel is referred to as "pixel voltage". The pixel voltage refers to a voltage applied between the pixel electrode and the counter electrode of a pixel, which is represented by the potential of the pixel electrode relative to the potential of the counter electrode. When the potential of the pixel electrode is higher than that of the counter electrode, the polarity of the pixel voltage is assumed as positive. When the potential of the pixel electrode is lower than that of the counter electrode, the polarity of the pixel voltage is assumed as negative.

In TFT-type liquid crystal display devices, a pixel electrode connected with the drain electrode of a TFT is supplied with a display signal voltage which is supplied from a source bus line (signal line) connected with the source of the TFT. The difference between the display signal voltage supplied to the pixel electrode and the counter voltage supplied to the counter electrode corresponds to the pixel voltage.

In TFT-type liquid crystal display devices, the polarity of the pixel voltage typically reverses every frame period. Here, in the TFT-type liquid crystal display devices, the frame period refers to a period which is necessary for supplying pixel voltages to all pixels, which means a period extending from a selection of a certain gate bus line (scan line) to the next selection of that gate bus line. The frame period is also referred to as "vertical scan period". Pixels are arranged in a matrix of rows and columns. Typically, gate bus lines correspond to rows of the pixels, and source bus lines correspond to columns of the pixels. By a scan signal (gate signal) supplied to the gate bus line, TFTs of the pixels are turned on in a row-by-row manner, whereby pixel voltages are sequentially supplied in a row-by-row manner.

In conventional common TFT-type liquid crystal display devices, the frame period is 1/60 second (the frame frequency is 60 Hz). When the input video signal is a NTSC signal, for example, the NTSC signal is a signal for interlaced driving, and one frame (the frame frequency is 30 Hz) consists of two fields, an odd-numbered field and an even-numbered field (the field frequency is 60 Hz). However, in the TFT-type liquid crystal display devices, pixel voltages are supplied to all pixels so as to correspond to respective fields of the NTSC signal, and therefore, the frame period of the TFT-type liquid crystal display devices is 1/60 second (the frame frequency is 60 Hz). Note that, recently, TFT-type liquid crystal display devices of 2×-speed driving (the frame frequency is 120 Hz) and 4×-speed driving (the frame frequency is 240 Hz), for the purpose of improving the movie display characteristics or realizing a 3D display operation, are commercially available. Thus, the TFT-type liquid crystal display devices include a driving circuit which is configured such that the frame period (frame frequency) is determined according to an input video signal, and all pixels are supplied with pixel voltages within each frame period.

In recent years, liquid crystal display devices of the transverse electric field mode, represented by In-Plane Switching (IPS) mode and Fringe Field Switching (FFS) mode, have been used in a wider variety of applications. In liquid crystal display devices of the transverse electric field mode, flickers in the screen which are attributed to the polarity reversal of the pixel voltage are more likely to be perceived than in liquid crystal display devices of the longitudinal electric field mode, such as Vertical Alignment (VA) mode. This is probably because, when the alignment of liquid crystal molecules in the liquid crystal layer undergoes a change which involves a bend deformation or a splay deformation, an alignment polarization occurs due to the asymmetry of the alignment of the liquid crystal molecules. A polarization change which can be caused by such spatial unevenness of the arrangement of dipoles (liquid crystal molecules) is called "Flexo-electric Effect".

Patent Document 1 discloses a liquid crystal display device which is configured such that a pixel electrode is divided into the first and second regions, the difference between the number of comb teeth in the first region and the number of comb teeth in the second region is one, and the number of comb teeth formed in the pixel region is equal to the number of slits between the comb teeth, whereby the flexoelectric effect is reduced.

Patent Document 2 discloses a liquid crystal display device in which the distribution of an electric field is controlled by, for example, providing a dummy electrode which is parallel to a plurality of band-like portions of the pixel electrode in a region between two adjoining pixel electrodes. Such a solution also enables to reduce the flexoelectric effect.

A low power consumption liquid crystal display device which includes TFTs which include an oxide semiconductor layer (e.g., an In—Ga—Zn—O based semiconductor layer) is commercially available from the applicant of the present application. A TFT which includes an In—Ga—Zn—O based semiconductor layer has high mobility (20 times or more as compared with a-SiTFT) and low current leakage (less than 1/100 as compared with a-SiTFT). When TFTs which include an In—Ga—Zn—O based semiconductor layer are used as the pixel TFTs, the current leakage is small. Therefore, the power consumption can be reduced by applying an intermittent driving method (also known as "low frequency driving method").

The intermittent driving method is disclosed in, for example, Patent Document 3. According to the intermittent driving method, in the traditional 60 Hz driving (1 frame period=1/60 second), an image is written in 1 frame period (1/60 second) and no image is written in the subsequent 59 frame periods (59/60 second), and this cycle is repeated. This intermittent driving method is also known as "1 Hz driving" because an image is written only once within one second. Here, the intermittent driving method refers to a driving method which has a pause period which is longer than a period where an image is written, or to low frequency driving where the frame frequency is lower than 60 Hz.

Whether or not it is likely to be perceived as a flicker depends on a frequency at which a variation of the luminance occurs. For example, even a variation of the luminance which is inconspicuous at 60 Hz is likely to be perceived as a flicker when the frequency is lower than 60 Hz, for example, at 30 Hz or lower. It is known that, particularly when the luminance varies at a frequency near 10 Hz, a flicker is very conspicuous.

CITATION LIST

Patent Literature

Patent Document 1: Japanese Laid-Open Patent Publication No. 2010-2596
Patent Document 2: Japanese Laid-Open Patent Publication No. 2011-169973
Patent Document 3: WO 2013/008668
Patent Document 4: Japanese Laid-Open Patent Publication No. 2013-147657
Patent Document 5: Japanese Laid-Open Patent Publication No. 2004-182986

SUMMARY OF INVENTION

Technical Problem

When intermittent driving is performed in a liquid crystal display device of the transverse electric field mode, flickers are likely to occur as compared with a conventional normal operation. This is because, due to the polarity reversal of the pixel voltage, the effect of the alignment polarization of the liquid crystal molecules of the liquid crystal layer varies every frame, and as a result, increase and decrease of the luminance occurs at low frequencies, and this is perceived as a flicker. The techniques disclosed in Patent Document 1 and Patent Document 2 cannot be a solution to the occurrence of such a flicker.

The present invention was conceived for the purpose of solving the above-described problem. An object of the present invention is to provide a TFT liquid crystal display device of a transverse electric field mode in which flickers are unlikely to occur even when the display device is driven at a low frequency lower than 60 Hz.

Solution to Problem

A liquid crystal display device according to an embodiment of the present invention includes: a pair of substrates; a liquid crystal layer held between the pair of substrates, the liquid crystal layer containing one or more types of positive liquid crystal compounds whose dielectric anisotropy is positive and one or more types of negative liquid crystal compounds whose dielectric anisotropy is negative, a total content of the positive liquid crystal compounds not being smaller than a total content of the negative liquid crystal compounds; and a pixel electrode and a common electrode provided in one of the pair of substrates, the pixel electrode having a plurality of linear portions and a slit provided between adjoining two of the plurality of linear portions, the common electrode being insulated from the pixel electrode, wherein the pixel electrode and the common electrode apply across the liquid crystal layer a pixel voltage of positive polarity and a pixel voltage of negative polarity alternately at a frequency lower than 60 Hz.

In one embodiment, the pixel voltage of positive polarity and the pixel voltage of negative polarity are applied alternately at a frequency of 30 Hz or lower across the liquid crystal layer.

In one embodiment, the pixel voltage of positive polarity and the pixel voltage of negative polarity are applied alternately at a frequency of 10 Hz or lower across the liquid crystal layer.

In one embodiment, a flicker rate achieved when a liquid crystal display device using a negative liquid crystal material which contains the negative liquid crystal compound but does not contain the positive liquid crystal compound is driven at 1 Hz is lower than a flicker rate achieved when a liquid crystal display device using a positive liquid crystal material which contains the positive liquid crystal compound but does not contain the negative liquid crystal compound is driven at the predetermined frequency.

In one embodiment, the liquid crystal layer contains the negative liquid crystal compound in a proportion of not less than 2 volume % and not more than 30 volume %.

In one embodiment, the liquid crystal layer contains the negative liquid crystal compound in a proportion of not less than 2 volume % and not more than 15 volume %.

In one embodiment, a liquid crystal material which contains the positive liquid crystal compound but does not contain the negative liquid crystal compound is such a positive liquid crystal material that, when a positive polarity voltage and a negative polarity voltage which have substantially equal absolute values are applied alternately, a luminance over the slit decreases at a first decrease rate from a stable luminance achieved during application of the positive polarity voltage to a luminance achieved in a state where a luminance of an entire pixel is temporarily decreased and decreases at a second decrease rate from a luminance achieved in a state where a luminance of an entire pixel is temporarily decreased to a stable luminance achieved during application of the negative polarity voltage, while a luminance over the plurality of linear portions increases at a first increase rate from a stable luminance achieved during application of the positive polarity voltage to a luminance achieved in a state where a luminance of an entire pixel is temporarily decreased and increases at a second increase rate from a luminance achieved in a state where a luminance of an entire pixel is temporarily decreased to a stable luminance achieved during application of the negative polarity voltage, a liquid crystal material which contains the negative liquid crystal compound but does not contain the positive liquid crystal compound is such a negative liquid crystal material that, when a positive polarity voltage and a negative polarity voltage which have substantially equal absolute values are applied alternately, a luminance over the slit increases at a third increase rate from a stable luminance achieved during application of the positive polarity voltage to a luminance achieved in a state where a luminance of an entire pixel is temporarily decreased and increases at a fourth increase rate from a luminance achieved in a state where a luminance of an entire pixel is temporarily decreased to a stable luminance achieved during application of the negative polarity voltage, while a luminance over the plurality of linear portions decreases at a third decrease rate from a stable luminance achieved during application of the positive polarity voltage to a luminance achieved in a state where a luminance of an entire pixel is temporarily decreased and decreases at a fourth decrease rate from a luminance achieved in a state where a luminance of an entire pixel is temporarily decreased to a stable luminance achieved during application of the negative polarity voltage, and a difference in magnitude between the second decrease rate and the second increase rate for the positive liquid crystal material is greater than a difference in magnitude between the fourth increase rate and the fourth decrease rate for the negative liquid crystal material.

In one embodiment, the first decrease rate over the slit in the positive liquid crystal material is greater than the second decrease rate.

In one embodiment, a difference between the third increase rate and the fourth increase rate over the slit in the negative liquid crystal material is smaller than a difference between the first decrease rate and the second decrease rate in the positive liquid crystal material.

In one embodiment, when a positive polarity voltage and a negative polarity voltage which have substantially equal absolute values are applied alternately and a stable luminance of an entire pixel achieved during application of the positive polarity voltage and a stable luminance of an entire pixel achieved during application of the negative polarity voltage are substantially equal to each other, a temporary decrease occurs in the luminance of the entire pixel from the stable luminance of the entire pixel in a predetermined period immediately after the polarity is switched, the positive liquid crystal compound includes such a liquid crystal compound that, over the slit, a first difference is greater than a second difference, the first difference being a difference between a stable luminance achieved during application of the positive polarity voltage and a luminance achieved when the temporary decrease occurs in the luminance of the entire pixel, the second difference being a difference between a luminance achieved when the temporary decrease occurs in the luminance of the entire pixel and a stable luminance achieved during application of the negative polarity voltage, and the negative liquid crystal material includes such a liquid crystal compound that, over the slit, a difference between a third difference and a fourth difference is smaller than a difference between the first difference and the second difference, the third difference being a difference between a stable luminance achieved during application of the positive polarity voltage and a luminance achieved when the temporary decrease occurs in the luminance of the entire pixel, and the fourth difference being a difference between a luminance achieved when the temporary decrease occurs in the luminance of the entire pixel and a stable luminance achieved during application of the negative polarity voltage.

In one embodiment, the liquid crystal display device further includes a thin film transistor coupled with the pixel electrode, wherein an active layer of the thin film transistor includes an oxide semiconductor layer.

In one embodiment, the oxide semiconductor layer includes an In—Ga—Zn—O based semiconductor layer.

In one embodiment, the In—Ga—Zn—O based semiconductor layer includes a crystalline portion.

Advantageous Effects of Invention

According to a liquid crystal display device of an embodiment of the present invention, occurrence of flickers can be suppressed when low frequency driving is performed in a liquid crystal display device of a transverse electric field mode.

DESCRIPTION OF EMBODIMENTS

Hereinafter, a liquid crystal display device according to an embodiment of the present invention is described with reference to the drawings. Although in the following description an FFS mode liquid crystal display device is illustrated, embodiments of the present invention are not limited to the illustrated FFS mode liquid crystal display device 100 but are applicable to various known FFS mode liquid crystal display devices. Also, embodiments of the present invention are applicable to liquid crystal display devices of other transverse electric field modes, such as IPS mode.

Figure 1:
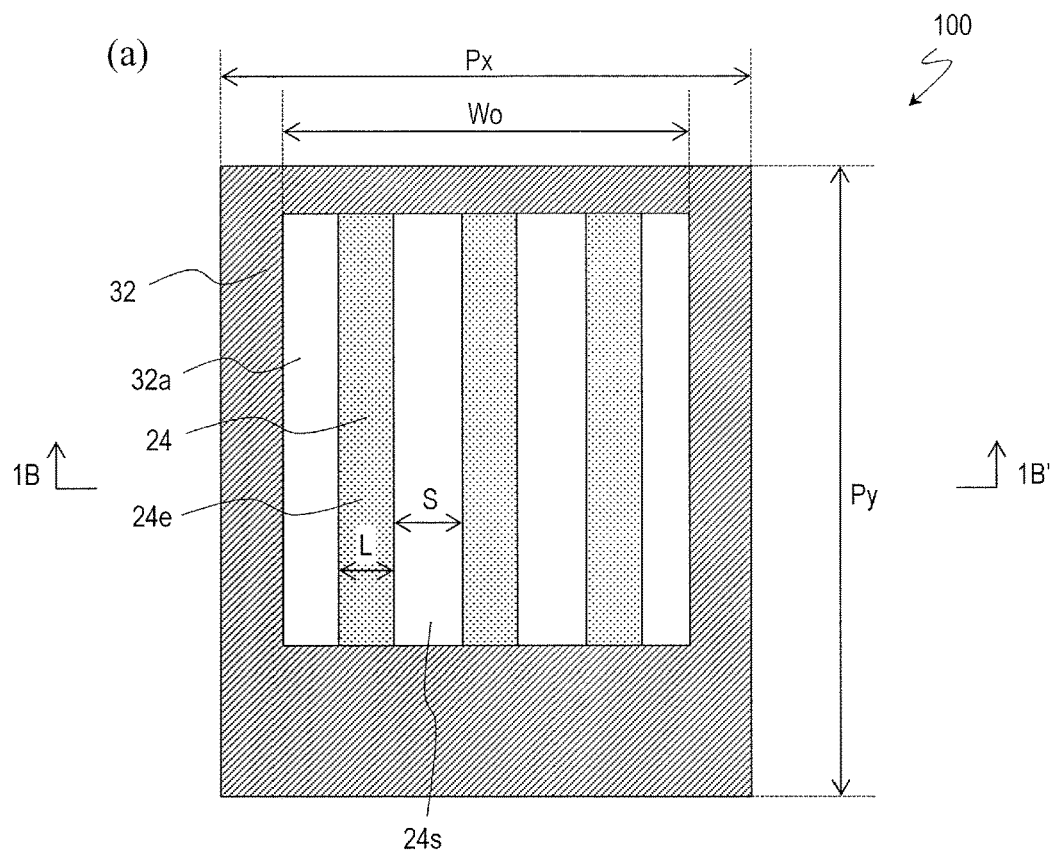
FIG. 1 Diagrams for schematically showing the configuration of a liquid crystal display device 100 of an embodiment of the present invention. (a) is a schematic plan view of the liquid crystal display device 100. (b) is a schematic cross-sectional view taken along line 1B-1B' of (a).
Figure 1:
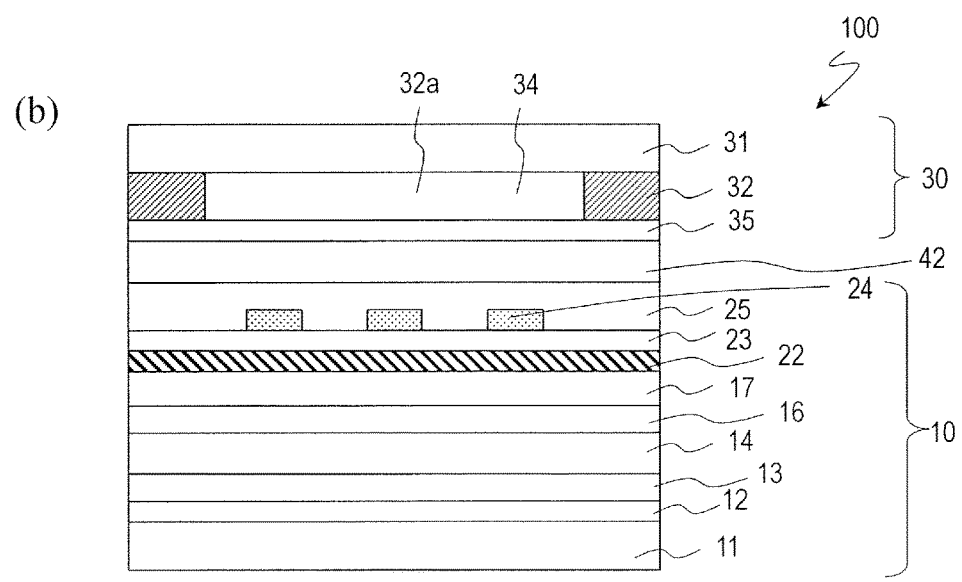

FIGS. 1(a) and 1(b) schematically shows the configuration of the liquid crystal display device 100 according to an embodiment of the present invention. The liquid crystal display device 100 is an FFS mode TFT-type liquid crystal display device. FIG. 1(a) is a schematic plan view of the liquid crystal display device 100. FIG. 1(b) is a schematic cross-sectional view taken along line 1B-1B' of FIG. 1(a). FIGS. 1(a) and 1(b) show a region corresponding to one pixel of the liquid crystal display device 100.

The liquid crystal display device 100 includes a plurality of pixels arranged in a matrix of rows and columns in a display region and unshown driving circuits provided outside the display region. The driving circuits only need to be configured to supply pixel voltages to the pixels as will be described later, and may be provided in a peripheral region (frame region) outside the display region formed by the plurality of pixels or may be separately provided. Note that, in FIG. 1(a), Px represents the arrangement pitch of pixels in the row direction, Py represents the arrangement pitch of pixels in the column direction, and Wo represents the effective pixel aperture width.

The liquid crystal display device 100 includes a TFT substrate 10 (first substrate) 10, a counter substrate (second substrate) 30, and a liquid crystal layer 42 provided between the TFT substrate 10 and the counter substrate 30. The liquid crystal display device 100 further includes a pair of unshown polarizers. The pair of polarizers are provided on the outer sides of the TFT substrate 10 and the counter substrate 30 and are in a crossed Nicols arrangement such that the transmission axis (polarization axis) of one polarizer extends along a horizontal direction while the transmission axis of the other polarizer extends along a vertical direction.

The TFT substrate 10 includes a first alignment film 25, a first electrode 24, a dielectric layer 23, and a second electrode 22 in this order from the liquid crystal layer 42 side. The first electrode 24 has a plurality of linear portions 24e which are parallel with one another (or slits 24s or openings provided between two adjoining linear portions 24e). Although in the configuration illustrated herein the first electrode 24 has the plurality of linear portions 24e, the second electrode 22 may have a plurality of linear portions. The linear portions 24e are formed by, for example, forming a plurality of slits in an electrically-conductive film that is to form the first electrode 24.

It is only necessary that the one of the first electrode 24 and the second electrode 22 is the pixel electrode while the other is the counter electrode (common electrode). In the example illustrated herein, the first electrode 24 is the pixel electrode while the second electrode 22 is the counter electrode.

In the case of this example, the counter electrode (second electrode) 22 is typically in the form of a solid electrode (a film electrode which has no slits). The counter electrode may extend over the entire display region so as to be common to the plurality of pixels.

The width of each of the plurality of linear portions 24e of the pixel electrode 24, L, is not less than 1.5 μm and not more than 5.0 μm, for example. The width of the gap (slit 24s) between two adjoining linear portions 24e, S, is more than 2.0 μm and not more than 6.0 μm, for example. The pixel electrode 24 and the counter electrode 22 are made of a transparent electrically-conductive material, such as ITO (indium tin oxide).

The pixel electrode 24 is coupled with the drain electrode of the TFT and is supplied with a display signal voltage from a source bus line (not shown) coupled with the source electrode of the TFT via the TFT. The source bus line is arranged so as to extend in the column direction. The gate bus line is arranged so as to extend in the row direction. The TFT used herein is preferably a TFT in which an oxide semiconductor is used. An oxide semiconductor suitably used in the liquid crystal display device 100 will be described later. Various forms of the FFS mode liquid crystal display device which includes TFTs in which an oxide semiconductor is used are known. FIG. 1(b) schematically shows, as an example, a multilayer structure in the case where bottom gate type TFTs are included.

The TFT substrate 10 includes a substrate (e.g., glass substrate) 11, a gate metal layer 12 provided on the substrate 11, a gate insulating layer 13 covering the gate metal layer 12, an oxide semiconductor layer 14 provided on the gate insulating layer 13, a source metal layer 16 provided on the oxide semiconductor layer 14, and an interlayer insulating layer 17 provided on the source metal layer 16.

Although simplified herein, the gate metal layer 12 includes a gate electrode, a gate bus line, and a wire for the counter electrode, the oxide semiconductor layer 14 includes an active layer of the TFT, and the source metal layer 16 includes a source electrode, a drain electrode, and a source bus line. The counter electrode 22 is provided on the interlayer insulating layer 17. When necessary, a flattening layer may be further provided between the interlayer insulating layer 17 and the counter electrode 22.

The counter substrate 30 includes, on a substrate (e.g., glass substrate) 31, a second alignment film 35 and a light blocking layer 32 (black matrix) which has an opening 32a in this order from the liquid crystal layer 42 side. The opening 32a of the light blocking layer 32 is provided with a color filter layer 34. The light blocking layer 32 can be formed using, for example, a black resin layer which has photosensitivity. The color filter layer 34 can also be formed using, for example, a colored resin layer which has photosensitivity. When necessary, a transparent electrically-conductive layer (not shown) which is made of ITO or the like can be provided for antistatic purposes at the outer side of the substrate 31 (at the side opposite to the liquid crystal layer 42).

In the liquid crystal display device 100 of the present embodiment, the liquid crystal layer 42 contains a nematic liquid crystal compound whose dielectric anisotropy is positive (hereinafter, referred to as "positive liquid crystal compound") and a nematic liquid crystal compound whose dielectric anisotropy is negative (hereinafter, referred to as "negative liquid crystal compound"). More specifically, the liquid crystal layer 42 contains a liquid crystal compound which satisfies "dielectric anisotropy $\Delta\varepsilon > 3$" as the positive liquid crystal compound and a liquid crystal compound which satisfies "dielectric anisotropy $\Delta\varepsilon < -1.5$" as the negative liquid crystal compound. Note that in this specification, the dielectric anisotropy $\Delta\varepsilon$ was measured under the conditions that the frequency was 1 kHz and the temperature was 20° C.

The liquid crystal layer 42 may be formed using a liquid crystal material which is realized by mixing together a positive liquid crystal material and a negative liquid crystal material. Here, the positive liquid crystal material means a liquid crystal material which contains one or more types of positive liquid crystal compounds. The positive liquid crystal material may contain a compound whose dielectric anisotropy is neutral in addition to the positive liquid crystal compounds. The negative liquid crystal material means a liquid crystal material which contains one or more types of negative liquid crystal compounds. The negative liquid crystal material may also contain a compound whose dielectric anisotropy is neutral in addition to the negative liquid crystal compounds.

In the present embodiment, the liquid crystal layer 42 mainly contains a positive liquid crystal compound. In the liquid crystal layer 42, the total content of the positive liquid crystal compound is not lower than the total content of the negative liquid crystal compound and is, typically, greater than the total content of the negative liquid crystal compound. The total content of the negative liquid crystal compound is, for example, not less than 1 volume % and not more than 40 volume %, preferably not less than 2 volume % and not more than 30 volume %, relative to the total liquid crystal material. From the viewpoint of preventing decrease of the liquid crystal responsiveness, the total content of the negative liquid crystal compound is preferably not more than 15 volume %.

The negative liquid crystal compound used can be, for example, MLC-6608 (manufactured by Merck). The positive liquid crystal compound used can be, for example, ZLI-1565 (manufactured by Merck).

Note that such a liquid crystal material containing a positive liquid crystal compound and a negative liquid crystal compound is disclosed in Patent Document 4 or Patent Document 5. Patent Document 4 discloses that, when a positive liquid crystal material is mixed with a negative liquid crystal material, the response and the temperature characteristics are improved. Patent Document 5 discloses that, when a negative liquid crystal material is mixed with a positive liquid crystal material, the response and the temperature characteristics are improved.

When the liquid crystal layer 42 contains both an appropriate amount of positive liquid crystal compound and an appropriate amount of negative liquid crystal compound, occurrence of flickers can be effectively suppressed particularly in the case of intermittent driving (or low frequency driving at lower than 60 Hz) without marring the response speed and the transmittance. This principle will be described later.

Note that, in the FFS mode liquid crystal display device 100, the liquid crystal molecules contained in the liquid crystal layer 42 are aligned generally horizontal to the substrate surface due to the first alignment film 25 and the second alignment film 35. The azimuth of the alignment restricted by the first alignment film 25 and the second alignment film 35 may be parallel or antiparallel. The azimuth of the alignment restricted by the first alignment film 25 and the second alignment film 35 is generally parallel to the direction of extension of the linear portions 24e. Note that, however, the azimuth of the alignment restricted by the alignment films may be different by, for example, 3° to 7° relative to the direction of extension of the linear portions 24e. The pretilt angle defined by the first alignment film 25 and the second alignment film 35 (the elevation angle of the liquid crystal molecules relative to the film surfaces of the alignment films) is, for example, 0°.

In this configuration, when a pixel voltage is applied, the liquid crystal molecules are rotated in a plane due to an electric field which occurs between the pixel electrode 24 and the counter electrode 22, whereby a display operation is realized.

Here, the variation of the luminance distribution at the time of polarity reversal driving in a conventional FFS mode liquid crystal display device is described. In the conventional liquid crystal display device which will be described below, the liquid crystal layer is made of only a positive liquid crystal material, and this is different from the embodiment of the present invention.

Figure 2:
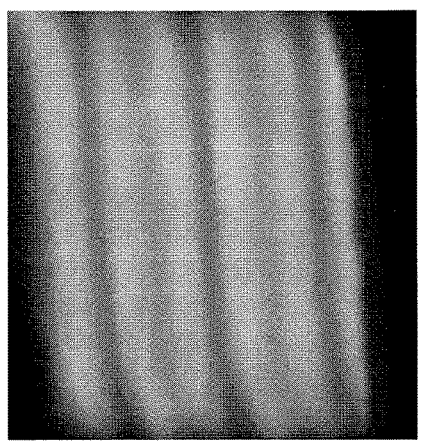
FIG. 2 Graphs showing the luminance distribution in a pixel of an FFS mode liquid crystal display device. (a) shows the luminance distribution when the pixel voltage was +2 V. (b) shows the luminance distribution when the pixel voltage was −2 V.
Figure 2:
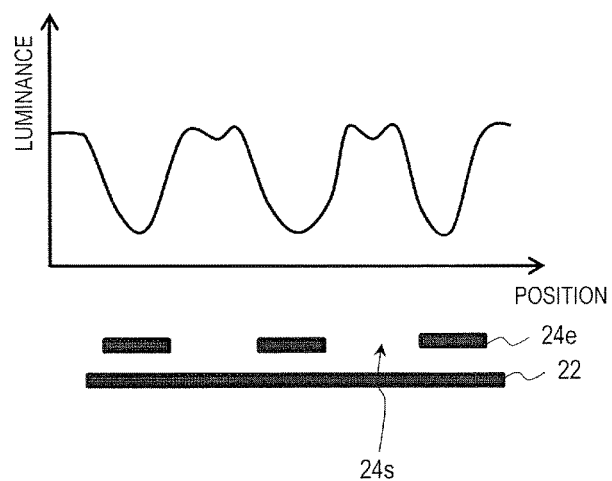
Figure 2:
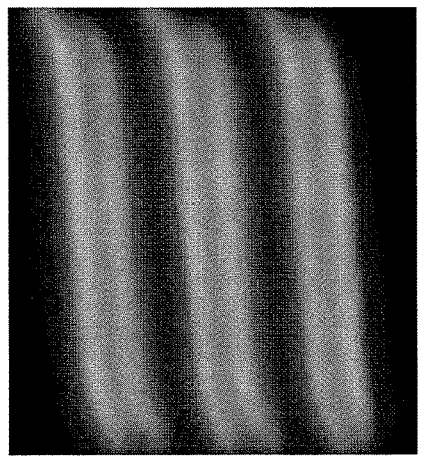
Figure 2:
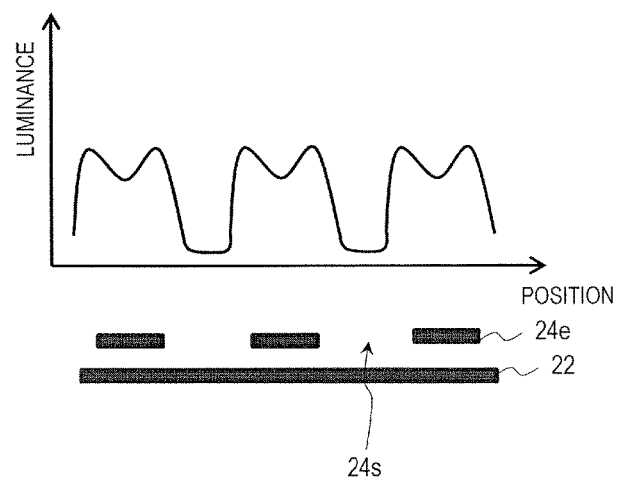

FIG. 2 presents graphs showing the luminance distribution in a pixel of a conventional liquid crystal display device. FIG. 2(*a*) shows the luminance distribution achieved during application of a positive polarity voltage where the pixel voltage was +2 V. FIG. 2(*b*) shows the luminance distribution achieved during application of a negative polarity voltage where the pixel voltage was −2 V. Here, the pixel voltage is defined as a voltage of the pixel electrode 24 relative to the potential of the counter electrode 22.

As clearly seen from the comparison between the images of the luminance distribution in the pixel shown in FIGS. 2(*a*) and 2(*b*), the pixel is brighter when a positive pixel voltage (>0 V) is applied than when a negative pixel voltage (<0 V) is applied. The images of the pixel shown herein were obtained by observation with a microscope of a pixel of a liquid crystal display panel manufactured as a trial piece. The liquid crystal layer is made of a positive liquid crystal material although it has the configuration shown in FIGS. 1(*a*) and 1(*b*).

As seen from FIG. 2(*a*), when a positive pixel voltage is applied, the luminance is high at the slits 24s of the pixel electrode 24 while the luminance is low at the linear portions 24e of the pixel electrode 24. On the other hand, as seen from FIG. 2(*b*), when a negative pixel voltage is applied, the luminance is high at the linear portions 24e of the pixel electrode 24 while the luminance is low at the slits 24s of the pixel electrode 24. This is probably because the alignment of the liquid crystal molecules differs depending on whether the polarity of the applied voltage is positive or negative even when the largeness (absolute value) of the applied voltage is equal.

Now, this phenomenon is described more specifically. It is estimated that, when a positive polarity voltage is applied, flexoelectric polarization resulting from a local alignment disorder of the liquid crystal molecules (e.g., a splay alignment which is attributed to a perpendicular electric field component) does not hinder in-plane rotation of liquid crystal molecules lying above the slits which is caused by a transverse electric field component but hinder in-plane rotation of liquid crystal molecules lying above the linear portions which is caused by a transverse electric field component. On the other hand, it is estimated that, when a negative polarity voltage is applied, an alignment disorder and flexoelectric polarization, which are different from those caused during application of a positive polarity voltage, occur and this flexoelectric polarization hinders in-plane rotation of liquid crystal molecules lying above the slits but does not hinder in-plane rotation of liquid crystal molecules lying above the linear portions. As a result, it is estimated that a brighter region and a darker region differ depending on whether the polarity of the applied voltage is positive or negative, i.e., depending on the difference in flexoelectric polarization that accordingly occurs. Thus, when a brighter region and a darker region are formed in different forms depending on the polarity of the pixel voltage, the luminance of the entire pixel (average luminance) is also likely to vary depending on the polarity of the pixel voltage.

When a pixel whose luminance varies according to the polarity of the pixel voltage is driven by an alternate driving method, the variation of the luminance which is caused by the variation of the polarity is likely to be perceived as a flicker particularly in the case of low frequency driving. This is because a luminance decrease occurs at the timing of switching the polarity even if an offset voltage is added to adjust the balance between the positive polarity voltage and the negative polarity voltage. For example, when 1 Hz driving (an image is written in 1 frame period ($\frac{1}{60}$ second) and no image is written in the subsequent 59 frame periods ($\frac{59}{60}$ second), and this cycle is repeated) is performed, a flicker is perceived due to a temporary variation of the luminance which occurs within a short period after a polarity reversal. This transient luminance variation is a new problem which cannot be solved by the techniques disclosed in Patent Document 1 and Patent Document 2. This point is described more specifically with reference to FIG. 3.

Figure 3:
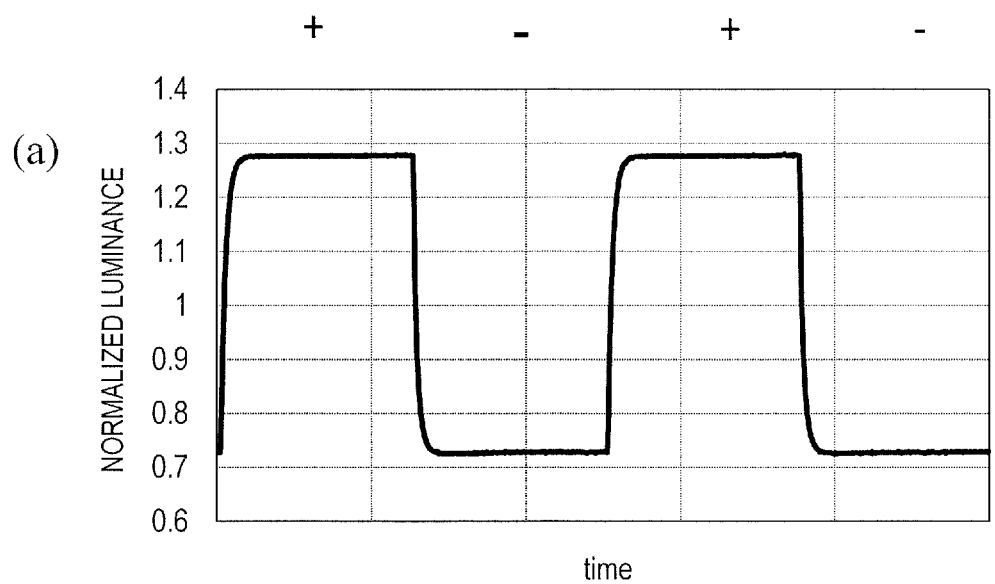
FIG. 3 Graphs showing the results of measurement of the variation over time of the luminance of one pixel when an FFS mode liquid crystal display device was driven at 1 Hz. (a) shows the result obtained when no offset voltage was applied. (b) shows the result obtained when an offset voltage was applied.
Figure 3:
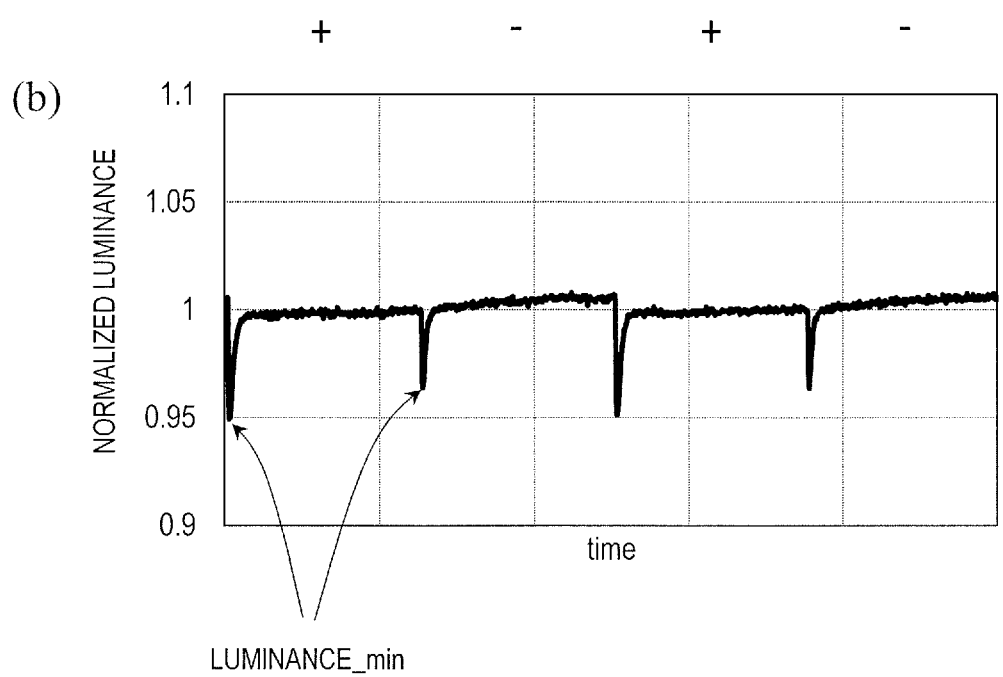

FIG. 3 presents graphs showing the results of measurement of the variation over time of the luminance of one pixel when 1 Hz driving was performed. FIG. 3(a) shows the result obtained when no offset voltage was applied. FIG. 3(b) shows the result obtained when an offset voltage was applied. The offset voltage refers to a DC voltage applied for the purpose of preventing flickers in common liquid crystal display devices, specifically to a voltage component applied to the pixel electrode and/or the counter electrode for the purpose of preventing the absolute value of the pixel voltage from differing between the positive polarity and the negative polarity mainly due to the introduced voltage of the TFT.

As seen from FIG. 3(a), in the case where no offset voltage is applied, the luminance achieved when the polarity of the pixel voltage is positive and the luminance achieved when the polarity of the pixel voltage is negative are greatly different. On the other hand, in the case where an offset voltage is applied, the difference between the luminance achieved when the polarity of the pixel voltage is positive and the luminance achieved when the polarity of the pixel voltage is negative is substantially zero as seen from FIG. 3(b).

However, as seen from FIG. 3(b), even when an offset voltage is applied, an instant luminance decrease occurs at the timing immediately after reversal of the polarity of the pixel voltage. In other words, a pixel becomes dark for a moment within a short period (e.g., several milliseconds) immediately after the polarity of the pixel voltage is switched, and thereafter, the pixel becomes bright again. Such a temporary luminance decrease which periodically occurs at the timing of switching of the polarity cannot be solved by the conventional techniques, including the techniques disclosed in Patent Document 1 and Patent Document 2.

Note that the above-described temporarily-decreased luminance is sometimes referred to as "luminance_min" (or "decreased luminance") in this specification. This luminance_min means a temporary decrease of the average luminance (the luminance of the entire pixel) which occurs at switching of the polarity even when the display device is driven under such conditions that the absolute value of the pixel voltage is constant, or the minimum of the luminance (average luminance) in that case. The luminance_min does not mean the minimum luminance in a predetermined region (e.g., a region above a slit) in a period during which a positive polarity pixel voltage or a negative polarity pixel voltage is stably applied. The minimum luminance in a predetermined region within a pixel in a period other than the switching of the polarity of the pixel voltage may be lower than the luminance_min.

The above-described luminance drop at every switching of the polarity occurs at a frequency which depends on the frame frequency. Therefore, when driving at lower than 60 Hz is performed according to the intermittent driving method, or the like, the luminance drop also occurs at a frequency lower than 60 Hz, and this is likely to be perceived as a flicker.

On the other hand, when the liquid crystal layer 42 contains a positive liquid crystal compound and a negative liquid crystal compound as in the liquid crystal display device 100 of the present embodiment, occurrence of flickers can be suppressed particularly in the case of low frequency driving. This is because the above-described temporary luminance decrease at switching of the polarity can be reduced by mixing only a predetermined amount of the negative liquid crystal compound.

FIGS. 4(a) and 4(b) show the luminance over the linear portions and slits of the pixel electrode (the luminance distributions in a pixel) in a case where a positive liquid crystal material (a liquid crystal material containing a positive liquid crystal compound but not containing a negative liquid crystal compound) was used and a case where a negative liquid crystal material (a liquid crystal material containing a negative liquid crystal compound but not containing a positive liquid crystal compound) was used. In each of FIGS. 4(a) and 4(b), a luminance distribution achieved during application of a positive voltage, a luminance distribution achieved during application of a negative voltage, and a luminance distribution achieved in the case of the luminance_min described above (i.e., within a short period immediately after switching of the polarity) are shown.

As seen from FIG. 4(a), in the case where a positive liquid crystal material is used, when the polarity of the pixel voltage reverses from positive to negative, the luminance over the slits 24s of the pixel electrode transitions from a high luminance state (a stable state achieved during application of a positive voltage) to a low luminance state (a stable state achieved during application of a negative voltage). Meanwhile, over the linear portions 24e of the pixel electrode, the luminance transitions from a low luminance state to a high luminance state. In this course, as seen from FIG. 3(b), a temporary drop occurs in the luminance of the entire pixel, and the luminance distribution represented by the luminance_min in FIG. 4(a), which corresponds to this luminance drop, is realized.

Here, as seen from FIG. 4(a), over the slits 24s, the luminance sharply decreases from a positive polarity luminance to the luminance_min, and thereafter, a moderate luminance decrease from the luminance_min to a negative polarity luminance occurs. In comparison, over the linear portions 24e, the degree of the increase in luminance from a positive polarity luminance to the luminance_min and the degree of the increase in luminance from the luminance_min to a negative polarity luminance are equal.

In this case, the luminance decrease rate per unit time over the slits 24s is much greater than the luminance increase rate per unit time over the linear portions 24e, and therefore, the luminance decrease degree is much greater than the luminance increase degree over the entire pixel at a certain time. Thus, the luminance over the entire pixel greatly decreases at a certain timing immediately after switching of the polarity, and the luminance drop in the luminance_min is large.

A like phenomenon occurs also when the luminance switches from a stable state achieved during application of a negative voltage to a stable state achieved during application of a positive voltage. Therefore, when a positive liquid crystal material is used, a relatively-large luminance decrease occurs at every timing of switching of the polarity from positive to negative or from negative to positive.

On the other hand, as seen from FIG. 4(b), in the case where a negative liquid crystal material is used, when the polarity of the pixel voltage reverses from positive to negative, the luminance over the slits 24s of the pixel electrode transitions from a low luminance state (a stable state achieved during application of a positive voltage) to a high luminance state (a stable state achieved during application of a negative voltage). Meanwhile, over the linear portions 24e of the pixel electrode, the luminance transitions from a high luminance state to a low luminance state. In this course, as seen from FIG. 3(b), a temporary drop occurs in the entire luminance, and the luminance distribution represented by the luminance_min in FIG. 4(b), which corresponds to this luminance drop, is realized.

Here, as seen from FIG. 4(b), over the slits 24s, a constant luminance increase from a positive polarity luminance to the luminance_min occurs, and thereafter, a similar constant luminance increase from the luminance_min to a negative polarity luminance occurs. Likewise, over the linear portions 24e, a relatively-constant luminance decrease from a positive polarity luminance to the luminance_min and a relatively-constant luminance decrease from the luminance_min to a negative polarity luminance occur.

In this case, the luminance decrease rate per unit time over the slits 24s is relatively approximate to the luminance increase rate per unit time over the linear portions 24e, and therefore, the luminance decrease degree and the luminance increase degree over the entire pixel are not much different throughout the period of switching of the polarity. Thus, the degree of the luminance drop in the luminance_min is relatively small.

A like phenomenon occurs also when the luminance switches from a stable state achieved during application of a negative voltage to a stable state achieved during application of a positive voltage. Therefore, when a negative liquid crystal material is used, the largeness of a luminance decrease which occurs at a timing of switching of the polarity from positive to negative or from negative to positive is small as compared with a case where a positive liquid crystal material is used.

Figure 5:
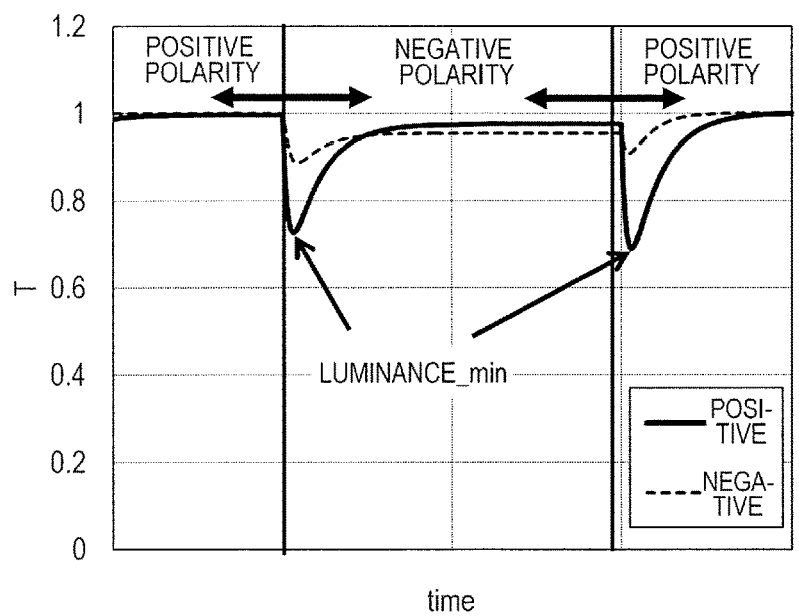
FIG. 5 A graph showing the variation over time of the luminance when a positive liquid crystal material was used and the variation over time of the luminance when a negative liquid crystal material was used.

FIG. 5 shows the variation over time of the average luminance when polarity reversal driving of offset voltage application is performed for respective one of the positive liquid crystal material and the negative liquid crystal material. Note that the luminance represented by the vertical axis of the graph is normalized with the maximum luminance in a stable state achieved during application of a positive or negative voltage.

Shown in FIG. 5 are the results obtained under the conditions that row direction pixel array pitch Px=27 µm, column direction pixel array pitch Py=81 µm, effective pixel aperture width Wo=19 µm, the ratio of the pixel electrode width L to the slit width S was L/S=3.1 µm/5 µm, birefringence Δn=1.03, applied voltage ±1.5 V, and cell gap 3.4 µm. The dielectric anisotropy of the positive liquid crystal material used herein was Δε=7.5. The dielectric anisotropy of the negative liquid crystal material was Δε=−7.5.

As seen from FIG. 5, the luminance drop at switching of the polarity was smaller when the negative liquid crystal material was used (broken line) than when the positive liquid crystal material was used (solid line). Therefore, when the negative liquid crystal material is used, the luminance drop at switching of the polarity can be smaller, and occurrence of flickers can be suppressed particularly in the case of intermittent driving.

The index for evaluation of occurrence of flickers can be a flicker rate which is defined as (Maximum Luminance− Minimum Luminance)/Average Luminance. According to the experiments carried out by the present inventors, in the case where the display device was driven at 1 Hz, the flicker rate was 26% when the positive liquid crystal material was used, while the flicker rate was 7% when the negative liquid crystal material was used. Thus, using the negative liquid crystal material enables to greatly reduce the flicker rate as compared with a case where the positive liquid crystal material is used.

Note that "maximum luminance", "minimum luminance", and "average luminance" used for definition of the flicker rate can be easily determined from the waveform data of the luminance of a liquid crystal panel which is detected using a photodiode according to a known common method. Specifically, the brightest luminance in the obtained waveform data is the maximum luminance, and the darkest luminance is the minimum luminance. The average of the whole waveform data is the average luminance.

Note that, however, using only the negative liquid crystal material in formation of the liquid crystal layer is difficult in many cases from the viewpoint of practical use. This is because many negative liquid crystal materials have higher viscosities than positive liquid crystal materials, and the problem of decrease in responsiveness of the liquid crystal can arise.

In view of such, the present inventors wholeheartedly conducted extensive research on using a mixture of a positive liquid crystal material and a negative liquid crystal material and appropriately selecting the mixture ratio of the materials (more specifically, the total amount of positive liquid crystal compounds contained in the positive liquid crystal material and the total amount of negative liquid crystal compounds contained in the negative liquid crystal material) so as to obtain a liquid crystal display device in which flickers are unlikely to occur even when it is driven particularly at lower than 60 Hz, particularly at 30 Hz or lower, within a range where a decrease in transmittance or responsiveness would not adversely affect the display operation.

Figure 6:
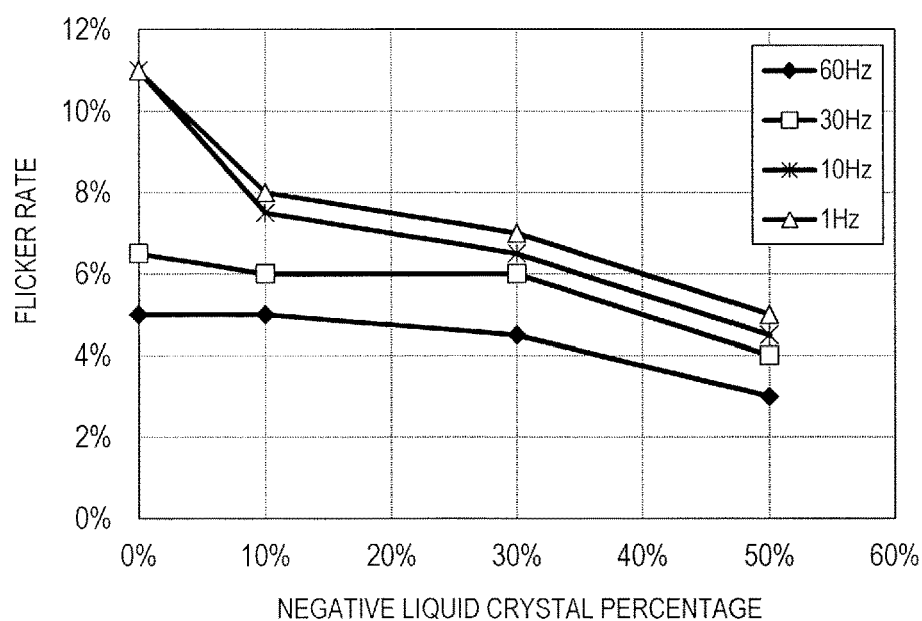
FIG. 6 A graph showing the relationship between the mixture ratio of a negative liquid crystal material and the flicker rate when the display device was driven at 60 Hz, 30 Hz, and 1 Hz.

FIG. 6 shows the results of an examination as to the flicker occurrence rate, where the display device was driven at 60 Hz, 30 Hz, 10 Hz, and 1 Hz, with varying mixture ratios of the negative liquid crystal compound and the positive liquid crystal compound. Note that the graph of FIG. 6 was obtained using simulation software, LCD Master 2D (manufactured by SHINTECH).

As seen from FIG. 6, the percentage of the total negative liquid crystal compounds to the whole liquid crystal material (volume %) was varied from 0% to 50%. It can be seen that, as a greater amount of negative liquid crystal compound is contained, the flicker rate decreases at each of the driving frequencies. Also, it can be seen that, particularly when the display device is driven at 1 Hz which is a low frequency, the flicker rate can be greatly reduced as compared with a case where no negative liquid crystal compound is contained.

It was understood from the above-described results that, at a driving frequency lower than 60 Hz, a negative liquid crystal compound is contained in the liquid crystal material in a proportion of 50 volume %, whereby a practical liquid crystal material can be obtained while occurrence of flickers is suppressed. It was found that, when the display device is driven at a frequency of 30 Hz or lower, particularly 10 Hz or lower, containment of a negative liquid crystal compound in a proportion of 2-30 volume % in the liquid crystal layer (the remaining is a positive liquid crystal compound) is effective for suppression of flickers.

Also, it was verified that, when the content of the negative liquid crystal compound is not more than 50 volume %, the transmittance and the responsiveness of the liquid crystal are satisfactorily maintained. Note that, as seen from FIG. 6, it was found that, particularly when an operation at a very low driving frequency (e.g., not more than 10 Hz), such as 1 Hz driving, is performed, containment of a negative liquid crystal compound in a proportion of about 10 volume % enables to sufficiently achieve the effect of improving the flicker rate. In consideration of the transmittance and the responsiveness, when driving is performed at, for example, 1 Hz to 10 Hz, the content of the negative liquid crystal compound only needs to be relatively small, specifically not less than 1 volume % and not less than 20 volume %, more specifically not less than 2 volume % and not more than 15 volume %.

Thus, the liquid crystal display device of the present embodiment is a transverse electric field mode liquid crystal display device in which a temporary luminance decrease occurs at switching of the polarity of the pixel voltage. Where the minimum luminance at which the above-described temporary luminance decrease occurs is a decreased luminance (luminance_min), the positive liquid crystal compound and the negative liquid crystal compound contained in the liquid crystal layer satisfy the conditions which will be described in the following paragraphs.

Figure 4:
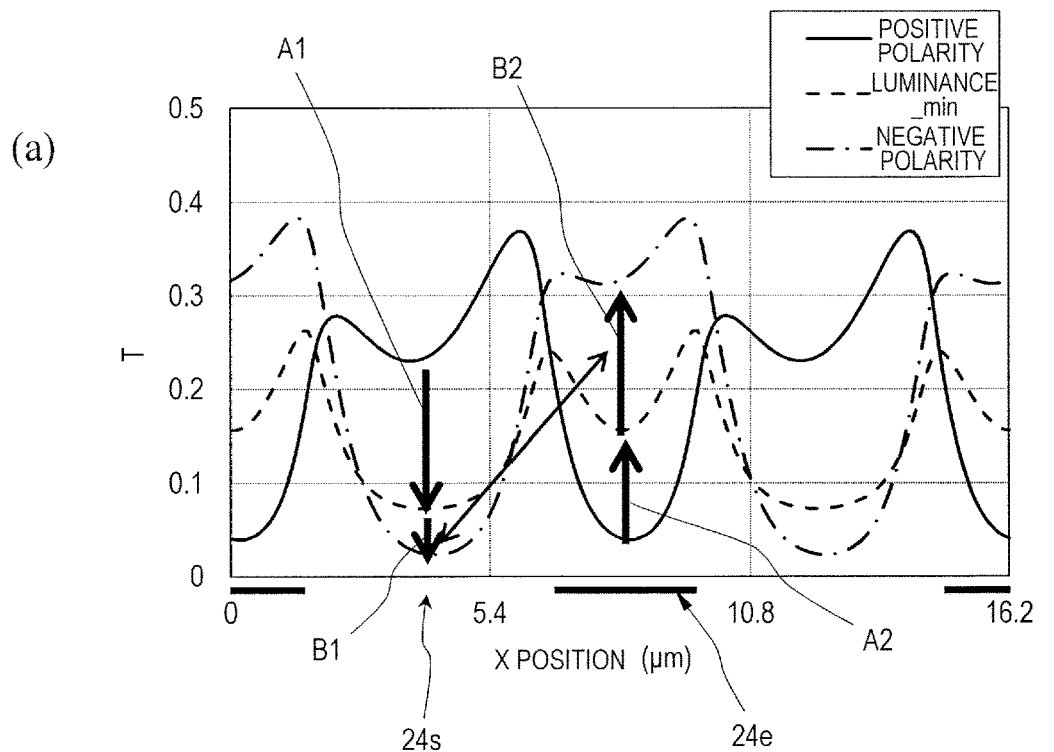
FIG. 4 (a) shows the luminance distribution in a pixel region at reversal of the polarity of the pixel voltage when a positive liquid crystal material was used. (b) shows the luminance distribution in a pixel region when a negative liquid crystal material was used.
Figure 4:
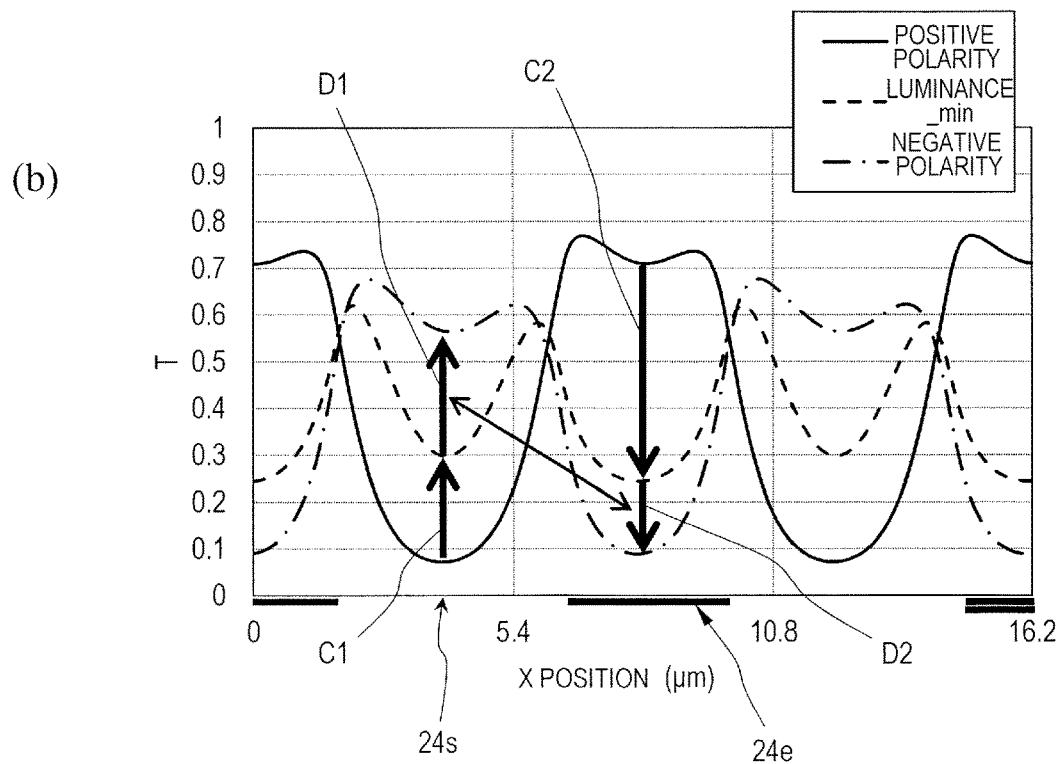

That is, a liquid crystal material used in the present embodiment which contains a positive liquid crystal compound but does not contain a negative liquid crystal compound (positive liquid crystal material) is such a material that, over the slits 24s of the pixel electrode, as seen from FIG. 4(*a*), the difference between a luminance achieved during a positive polarity and the decreased luminance, A1 (first difference), is substantially greater than the difference between a luminance achieved during a negative polarity and the decreased luminance, B1 (second difference). The ratio between difference A1 and difference B1 (A1:B1) is, for example, not less than 4:1 and not more than 2:1. Meanwhile, over the linear portions 24e of the pixel electrode, the difference between a luminance achieved during a positive polarity and the decreased luminance, A2 (fifth difference), is not much different from the difference between a luminance achieved during a negative polarity and the decreased luminance, B2 (sixth difference). The ratio between difference A2 and difference B2 (A2:B2) is, for example, not less than 2:1 and not more than 1:1. The difference between difference A1 over the slits (luminance decrease degree) and difference A2 over the linear portions (luminance increase degree) is not more than 20%.

On the other hand, a liquid crystal material used in the present embodiment which contains a negative liquid crystal compound but does not contain a positive liquid crystal compound (negative liquid crystal material) is such a material that, over the slits 24s of the pixel electrode, as seen from FIG. 4(*b*), the difference between a luminance achieved during a positive polarity and the decreased luminance, C1 (third difference), is not much different from the difference between a luminance achieved during a negative polarity and the decreased luminance, D1 (fourth difference). The ratio between difference C1 and difference D1 (C1:D1) is, for example, not less than 1:2 and not more than 1:1. Meanwhile, over the linear portions 24e of the pixel electrode, the difference between a luminance achieved during a positive polarity and the decreased luminance, C2 (seventh difference), is not much different from the difference between a luminance achieved during a negative polarity and the decreased luminance, D2 (eighth difference). The ratio between difference C2 and difference D2 (C2:D2) is, for example, not less than 1:2 and not more than 1:1.

The difference between difference C1 and difference D1 in the negative liquid crystal material is smaller than the difference between difference A1 and difference B1 in the positive liquid crystal material. The difference between difference D1 and difference D2 in the negative liquid crystal material is smaller than the difference between difference B1 and difference B2 in the positive liquid crystal material.

As described hereinabove, in the liquid crystal display device 100, the liquid crystal layer used contains a positive liquid crystal compound and a predetermined amount of negative liquid crystal compound. In driving where a positive polarity voltage and a negative polarity voltage are alternately applied, a luminance decrease which occurs at switching of the polarity is reduced, and flickers are suppressed. In the foregoing description, the above-described liquid crystal display device is configured such that a positive polarity voltage and a negative polarity voltage are alternately applied across the liquid crystal layer. The operation may not be carried out such that a pixel voltage of more than 0 V and a pixel voltage of less than 0 V are always supplied to the liquid crystal layer. The above-described positive polarity voltage and negative polarity voltage can include 0 V. For example, a voltage of 0 V may be applied over a plurality of frame periods. In the liquid crystal display device of the present embodiment, the lowest grayscale level voltage does not necessarily need to be set to 0 V but may be a minute offset voltage which has positive or negative polarity. In this case, when a display operation is performed at the lowest grayscale level, a minute voltage of positive or negative polarity can be continuously applied across the liquid crystal layer. A liquid crystal display device according to an embodiment of the present invention is configured such that, including such a case, a pixel voltage of positive polarity and a pixel voltage of negative polarity are alternately applied as a substantial pixel voltage (except for the lowest grayscale level voltage).

As a TFT of the liquid crystal display device 100 according to an embodiment of the present invention, a TFT which includes an oxide semiconductor layer is preferably used. As the oxide semiconductor, a semiconductor which is based on In—Ga—Zn—O elements (hereinafter, abbreviated as "In—Ga—Zn—O based semiconductor") is preferred, and an In—Ga—Zn—O based semiconductor which includes a crystalline portion is more preferred. Here, the In—Ga—Zn—O based semiconductor is a ternary oxide consisting of In (indium), Ga (gallium) and Zn (zinc). The proportion (composition ratio) of In, Ga and Zn is not particularly limited but includes, for example, In:Ga:Zn=2:2:1, In:Ga:Zn=1:1:1, and In:Ga:Zn=1:1:2.

A TFT which includes an In—Ga—Zn—O based semiconductor layer has high mobility (20 times or more as compared with an a-Si TFT) and low current leakage (less than 1/100 as compared with an a-Si TFT) and is therefore suitably used not only as a pixel TFT but also as a driver TFT. When a TFT which includes an In—Ga—Zn—O based semiconductor layer is used, the effective aperture ratio of the display device can be increased while the power consumption of a display device can be reduced.

The In—Ga—Zn—O based semiconductor may be amorphous or may include a crystalline portion. As the crystalline In—Ga—Zn—O based semiconductor, a crystalline In—Ga—Zn—O based semiconductor in which the c-axis is oriented generally perpendicular to the layer surface is preferred. The crystalline structure of such an In—Ga—Zn—O based semiconductor is disclosed in, for example, Japanese Laid-Open Patent Publication No. 2012-134475. The entire disclosure of Japanese Laid-Open Patent Publication No. 2012-134475 is incorporated by reference in this specification.

The oxide semiconductor layer may include a different oxide semiconductor instead of the In—Ga—Zn—O based semiconductor. For example, the oxide semiconductor layer may include a Zn—O based semiconductor (ZnO), an In—Zn—O based semiconductor (IZO (registered trademark)), a Zn—Ti—O based semiconductor (ZTO), a Cd—Ge—O based semiconductor, a Cd—Pb—O based semiconductor, a CdO (cadmium oxide), a Mg—Zn—O based semiconductor, an In—Sn—Zn—O based semiconductor (e.g., $In_2O_3$—$SnO_2$—ZnO), an In—Ga—Sn—O based semiconductor, or the like.

Alternatively, a driving method which is suitable for reduction of the above-described temporary luminance drop at switching of the polarity is applicable to the liquid crystal display device 100 of the present embodiment. Such a driving method is disclosed in WO 2015/025772 filed by the inventors of the present application. The entire disclosure of WO 2015/025772 is incorporated by reference in this application. Note that the liquid crystal display device 100 may include a driving circuit which has a known configuration capable of realizing intermittent driving at lower than 60 Hz (e.g., 10 Hz or lower), and that configuration can be easily understood.

Hereinafter, a method for driving the liquid crystal display device 100 is described with reference to FIG. 7 to FIG. 10. Note that, in FIG. 7 to FIG. 10, pixels which are subjected to polarity reversal are enclosed by a bold line, and pixels to which pixel voltages are applied are hatched.

Where a time interval equivalent to a frame period which is determined according to the input video signal is referred to as "refresh period", the driving circuit of the liquid crystal display device 100 is configured to perform: a first polarity reversal refresh operation in the first refresh period such that, of the plurality of pixels, only pixels of odd-numbered or even-numbered rows are each supplied with a pixel voltage whose polarity is opposite to that of the voltage held in that pixel; a pause operation in a pause period which follows the first refresh period, and which is longer than the refresh period, such that none of the plurality of pixels is supplied with a pixel voltage; and a second polarity reversal refresh operation in the second refresh period immediately subsequent to the pause period such that only pixels of even-numbered or odd-numbered rows which have not been supplied with a pixel voltage of the opposite polarity by the first polarity reversal refresh operation are each supplied with a pixel voltage whose polarity is opposite to that of the voltage held in that pixel. In each of the first polarity reversal refresh operation and the second polarity reversal refresh operation, polarity reversal occurs in every other row. Such polarity reversal is sometimes referred to as "1H reversal". All of the driving methods illustrated in FIG. 7 to FIG. 10 meet this condition.

Figure 7:
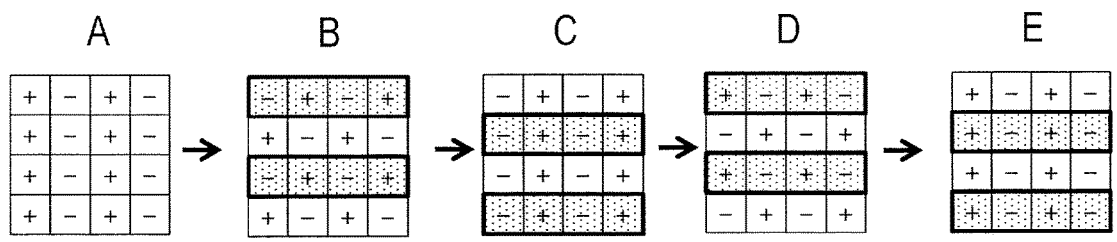
FIG. 7 (a) is a diagram showing an example of the sequence of polarity reversal brought about by an exemplary driving circuit of the liquid crystal display device 100. (b) is a schematic diagram showing the variation over time of the luminance.
Figure 7:
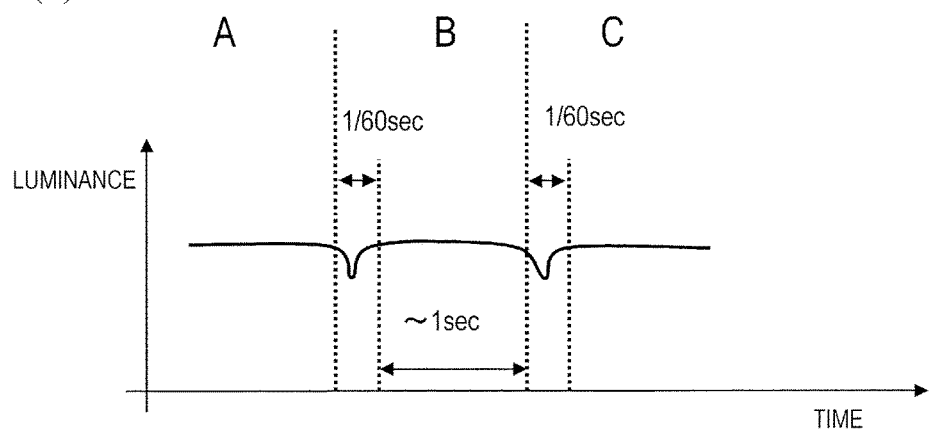
Figure 8:
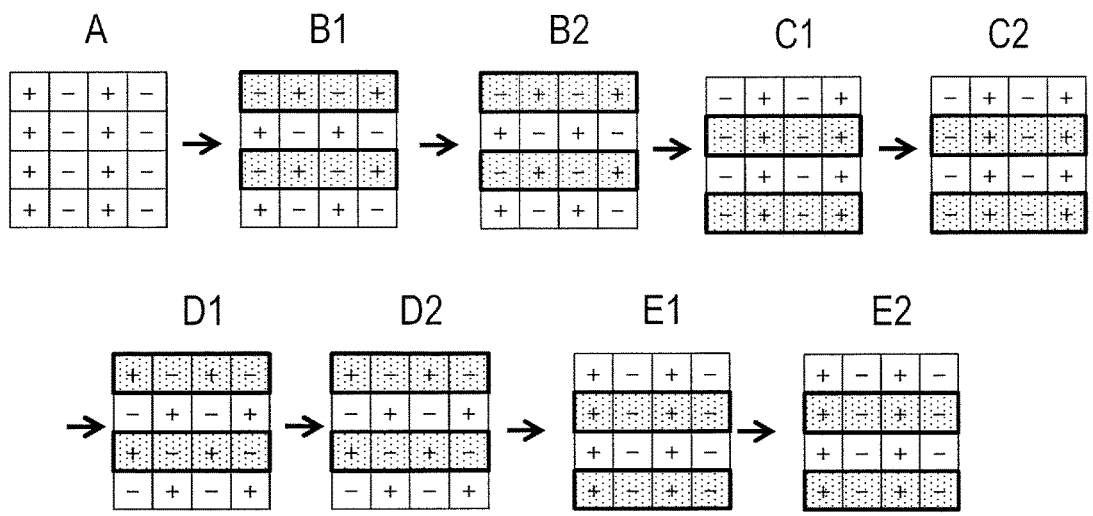
FIG. 8 A diagram showing another example of the sequence of polarity reversal brought about by an exemplary driving circuit of the liquid crystal display device 100.
Figure 9:
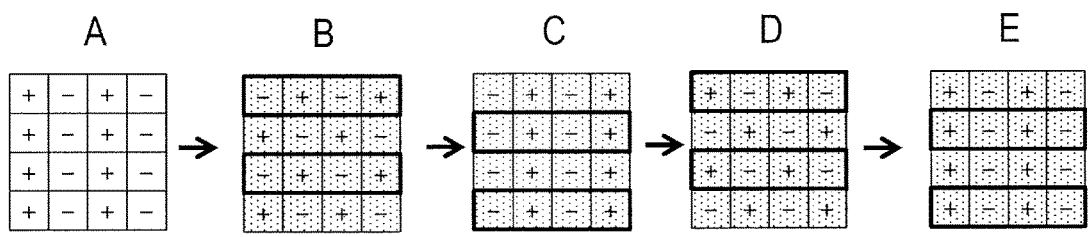
FIG. 9 A diagram showing still another example of the sequence of polarity reversal brought about by an exemplary driving circuit of the liquid crystal display device 100.

In the embodiments illustrated in FIG. 7 to FIG. 9, in the first refresh period, the polarity of a voltage held in each of the pixels of even-numbered or odd-numbered rows which are not supplied with a pixel voltage of the opposite polarity by the first polarity reversal refresh operation does not reverse. Therefore, in the first polarity reversal refresh operation, the duration of supply of the pixel voltage to the pixel can advantageously be long as compared with conventional techniques.

Firstly, an example of a driving method in which a polarity reversal refresh operation is performed in a 1H reversal mode is described with reference to FIG. 7(a). FIG. 7(a) is a diagram showing an example of the sequence of polarity reversal brought about by a driving circuit of the liquid crystal display device 100 according to an embodiment of the present invention.

As shown in FIG. 7(a), in a certain frame, Frame A, the array is such that the opposite pixel voltage polarities alternately occur in every column (sometimes referred to as "column reversed state" or "source bus line reversed state").

In the first refresh period corresponding to the next frame, Frame B, the first polarity reversal refresh operation is performed such that, of the plurality of pixels, only pixels of odd-numbered rows (or even-numbered rows) are each supplied with a pixel voltage whose polarity is opposite to that of the voltage held in that pixel, while pixels of even-numbered rows or odd-numbered rows which are not to be supplied with a pixel voltage of the opposite polarity by the first polarity reversal refresh operation are not supplied with a pixel voltage. Therefore, within the first refresh period, the duration of supply of the pixel voltage of the opposite polarity by the first polarity reversal refresh operation is longer than ½ of the refresh period. Thus, changing of the pixels can be sufficiently carried out. Note that the polarity distribution in Frame B is in a so-called dot reversed (1H dot reversed) state wherein pixels adjoining each other in whichever of the column and row directions have pixel voltages of opposite polarities.

During a pause period subsequent to Frame B, which is longer than the refresh period or frame period (here, 59/60 frames), a pause operation is performed such that none of the plurality of pixels is supplied with a pixel voltage.

Then, in the second refresh period corresponding to Frame C immediately subsequent to the pause period, a second polarity reversal refresh operation is performed such that only pixels of even-numbered rows (or odd-numbered rows) which have not been supplied with a pixel voltage of the opposite polarity by the first polarity reversal refresh operation are each supplied with a pixel voltage whose polarity is opposite to that of the voltage held in that pixel. Also in this operation, in the same way as described above, the pixels of odd-numbered rows (or even-numbered rows) which are not to be supplied with a pixel voltage of the opposite polarity by the second polarity reversal refresh operation are not supplied with a pixel voltage. The polarity distribution in Frame C is in a column reversed state, in which the polarity (positive or negative) is opposite to Frame A.

Thereafter, a pause operation is performed, and then, the previously-described operation is repeated with the odd-numbered rows and the even-numbered rows being replaced with each other (Frames D and E), whereby the same polarity distribution as that of Frame A is restored. In Frame D, the polarity distribution is in a dot reversed state ("1H dot reversed" is simply abbreviated as "dot reversed"). The polarity distribution is such that the positive and negative polarities are opposite to those of Frame B. Frame E has the same polarity distribution as that of Frame A.

Thus, the polarity distribution in the driving method illustrated in FIG. 7(a) alternates between a column reversed state and a dot reversed state at every refresh period. In the example illustrated in FIG. 7(a), Frame A is in a column reversed state, and the polarity is changed in the order of Frame A→Frame B→Frame C→Frame D→Frame E(=A), although the present invention is not limited to this example. For example, the sequence may be started from Frame D that is in a dot reversed state, and the polarity may be changed in the order of Frame D→Frame C→Frame B→Frame A(=E).

When such a driving method is used, a luminance decrease at polarity reversal can be reduced to about ½ as seen from FIG. 7(b). As a result, even when the display device is driven at a frequency lower than 60 Hz, flickers are unlikely to be perceived.

Note that the driving circuit may be configured to perform the polarity reversal sequence shown in FIG. 8. Specifically, in the sequence shown in FIG. 8, in the first refresh period, only pixels of odd-numbered rows (or even-numbered rows) which have been supplied with a pixel voltage of the opposite polarity by the first polarity reversal refresh operation are again supplied with a pixel voltage of the opposite polarity, while in the sequence shown in FIG. 7(a) the polarity reversal refresh operation is performed only once in one refresh period (frame period). The same also applies to the second refresh period. Specifically, where Frame B consists of two subframes, Subframe B1 ($\frac{1}{120}$ second) and Subframe B2 ($\frac{1}{120}$ second), pixel voltages of the same opposite polarity are supplied in periods corresponding to the respective subframes. The period in which the pixel voltage of the opposite polarity is supplied is not more than $\frac{1}{2}$ of the refresh period. In TFT-type liquid crystal display devices, as well known in the art, when a pixel voltage is applied only once, a pixel does not reach a desired voltage. Although overshoot driving may be performed as a matter of course, the driving circuit may be configured to apply a pixel voltage twice in succession as illustrated in FIG. 8 such that a desired voltage is reached. The same also applies to Frame C and subsequent frames.

In the sequences shown in FIG. 7 and FIG. 8, a pixel voltage is supplied only to a pixel which is to undergo polarity reversal. Therefore, the time interval in which a pixel voltage is supplied to each of the plurality of pixels is not less than twice the pause period. That is, each pixel needs to hold the pixel voltage for a longer duration (twice or longer) than in conventional techniques. There is a probability that the voltage held by the pixel decreases due to the characteristics of the TFT.

In such a case, the driving circuit may be configured to perform the polarity reversal sequence illustrated in FIG. 9. Specifically, in the sequence illustrated in FIG. 9, in the first refresh period, a first polarity-maintaining refresh operation is performed in addition to the first polarity reversal refresh operation. In the first polarity-maintaining refresh operation, only pixels of even-numbered rows (or odd-numbered rows) which are not to be supplied with a pixel voltage of the opposite polarity by the first polarity reversal refresh operation are each supplied with a pixel voltage whose polarity is the same as that of the voltage held in that pixel. Thus, when the sequence of FIG. 9 is used, pixel voltages are supplied to all the pixels in each refresh period, and therefore, the time interval in which a pixel voltage is supplied to each of the plurality of pixels is equal to the pause period.

Figure 10:
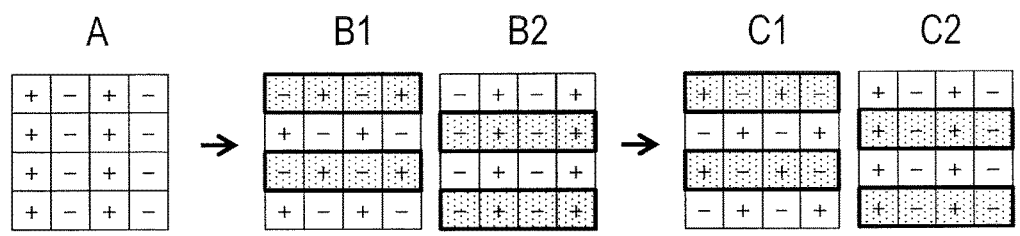
FIG. 10 (a) is a diagram showing still another example of the sequence of polarity reversal brought about by an exemplary driving circuit of the liquid crystal display device 100. (b) is a schematic diagram showing the variation over time of the luminance.
Figure 10:
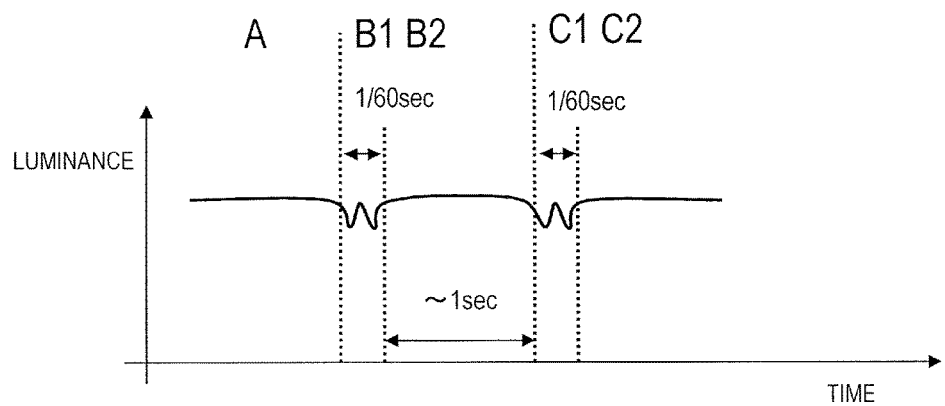

Still alternatively, the driving circuit may be configured to perform the polarity reversal sequence illustrated in FIG. 10. In the sequence illustrated in FIG. 10, in the first refresh period, a second polarity reversal refresh operation is performed in addition to the first polarity reversal refresh operation. In the second polarity reversal refresh operation, only pixels of even-numbered rows (or odd-numbered rows) which have not been supplied with a pixel voltage of the opposite polarity by the first polarity reversal refresh operation are each supplied with a pixel voltage whose polarity is opposite to that of the voltage held in that pixel. Specifically, where Frame B consists of two subframes, Subframe B1 ($\frac{1}{120}$ second) and Subframe B2 ($\frac{1}{120}$ second), the first polarity reversal refresh operation is performed in a period corresponding to Subframe B1, and the second polarity reversal refresh operation is performed in a period corresponding to Subframe B2.

When such a driving method is used, decrease in luminance at polarity reversal occurs twice as seen from FIG. 10(b), although the degree of the decrease can be reduced to about $\frac{1}{2}$. Therefore, even when the display device is driven at a frequency lower than 60 Hz, flickers are unlikely to be perceived.

The liquid crystal display device of the above-described embodiment includes a driving circuit which is configured to perform a polarity reversal refresh operation (1H reversal) in the first refresh period and the second refresh period such that only pixels of even-numbered rows or odd-numbered rows are each supplied with a pixel voltage whose polarity is opposite to that of the voltage held in that pixel. However, a liquid crystal display device of an embodiment of the present invention is not limited to such a driving circuit. The liquid crystal display device may include a driving circuit which is configured to perform a polarity reversal refresh operation (2H reversal) in the first refresh period such that, of the pixels of a plurality of pairs of adjoining rows (each pair consisting of an odd-numbered row and an even-numbered row adjoining each other), only pixels of even-numbered pairs or odd-numbered pairs are each supplied with a pixel voltage whose polarity is opposite to that of the voltage held in that pixel.

Specifically, such a driving circuit is configured to perform: a first polarity reversal refresh operation in the first refresh period such that, of a plurality of pixels in a plurality of pairs of adjoining rows (each pair consisting of an odd-numbered row and an even-numbered row adjoining each other), only pixels of even-numbered pairs or odd-numbered pairs are each supplied with a pixel voltage whose polarity is opposite to that of the voltage held in that pixel; a pause operation in a pause period which follows the first refresh period, and which is longer than the refresh period, such that none of the plurality of pixels is supplied with a pixel voltage; and a second polarity reversal refresh operation in the second refresh period immediately subsequent to the pause period such that only pixels of even-numbered or odd-numbered pairs which have not been supplied with a pixel voltage of the opposite polarity by the first polarity reversal refresh operation are each supplied with a pixel voltage whose polarity is opposite to that of the voltage held in that pixel. Each of the first polarity reversal refresh operation and the second polarity reversal refresh operation is performed on every other pair of rows and is therefore sometimes referred to as "2H reversal".

Figure 11:
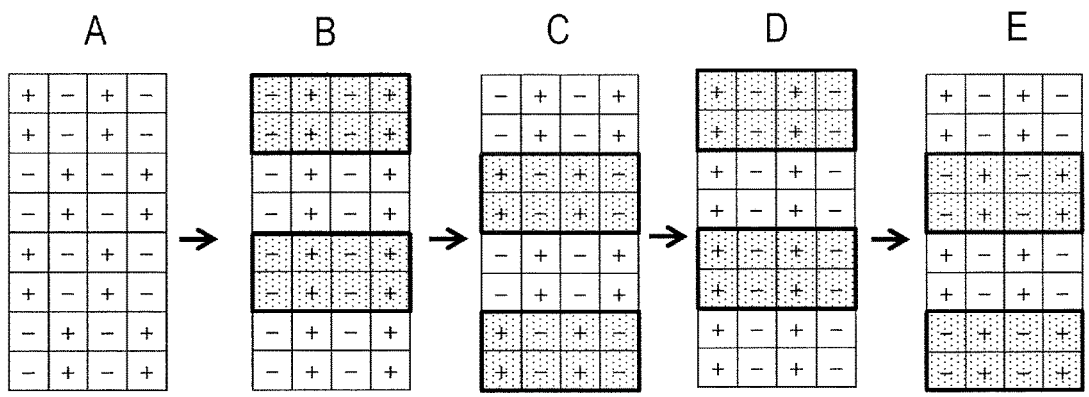
FIG. 11 A diagram showing an example of the sequence of polarity reversal brought about by a driving circuit of a liquid crystal display device of another embodiment of the present invention.

An example of a driving method in which a polarity reversal refresh operation is performed in a 2H reversal mode is described with reference to FIG. 11. FIG. 11 is a diagram showing an example of the sequence of polarity reversal brought about by a driving circuit which is configured to perform a polarity reversal refresh operation is performed in a 2H reversal mode, corresponding to FIG. 7(a) in which a polarity reversal refresh operation is performed in a 1H reversal mode. Note that, however, herein, the polarity distribution in Frame A is in a 2H dot reversed state.

As illustrated in FIG. 11, in Frame A, the array is such that the opposite pixel voltage polarities alternately occur in every two rows (2H dot reversed state).

In the first refresh period corresponding to the next frame, Frame B, the first polarity reversal refresh operation is performed such that, of a plurality of pixels in a plurality of pairs of adjoining rows (each pair consisting of an odd-numbered row and an even-numbered row adjoining each other), only pixels of odd-numbered pairs (or even-numbered pairs) are each supplied with a pixel voltage whose polarity is opposite to that of the voltage held in that pixel, while pixels of even-numbered rows or odd-numbered rows which are not to be supplied with a pixel voltage of the opposite polarity by the first polarity reversal refresh operation are not supplied with a pixel voltage. Therefore, within the first refresh period, the duration of supply of the pixel voltage of the opposite polarity by the first polarity reversal refresh operation is longer than ½ of the refresh period. Thus, changing of the pixels can be sufficiently carried out. Note that the polarity distribution in Frame B is such that the opposite pixel voltage polarities alternately occur in every column (column reversed state or source bus line reversed state).

During a pause period subsequent to Frame B, which is longer than the refresh period or frame period (here, 59/60 frames), a pause operation is performed such that none of the plurality of pixels is supplied with a pixel voltage.

Then, in the second refresh period corresponding to Frame C immediately subsequent to the pause period, a second polarity reversal refresh operation is performed such that only pixels of even-numbered pairs (or odd-numbered pairs) which have not been supplied with a pixel voltage of the opposite polarity by the first polarity reversal refresh operation are each supplied with a pixel voltage whose polarity is opposite to that of the voltage held in that pixel. Also in this operation, in the same way as described above, the pixels of odd-numbered pairs (or even-numbered pairs) which are not to be supplied with a pixel voltage of the opposite polarity by the second polarity reversal refresh operation are not supplied with a pixel voltage. The polarity distribution in Frame C is in a 2H dot reversed state, in which the polarity (positive or negative) is opposite to Frame A.

Thereafter, a pause operation is performed, and then, the previously-described operation is repeated with the odd-numbered pairs and the even-numbered pairs being replaced with each other (Frames D and E), whereby the same polarity distribution as that of Frame A is restored. In Frame D, the polarity distribution is in a column reversed state. The polarity distribution is such that the positive and negative polarities are opposite to those of Frame B. Frame E has the same polarity distribution as that of Frame A.

Thus, the polarity distribution in the driving method illustrated in FIG. 11 alternates between a 2H dot reversed state and a column reversed state at every refresh period. In the example illustrated in FIG. 11, Frame A is in a 2H dot reversed state, and the polarity is changed in the order of Frame A→Frame B→Frame C→Frame D→Frame E(=A), although the present invention is not limited to this example. For example, the sequence may be started from Frame D that is in a column reversed state, and the polarity may be changed in the order of Frame D→Frame C→Frame B→Frame A(=E).

Thus, in a case where when the polarity reversal refresh operation is performed in a 2H reversal mode, flickers are advantageously unlikely to be perceived even when the display device is driven at a frequency lower than Hz, as in a case where the polarity reversal refresh operation is performed in a 1H reversal mode. The same also applies to other examples of the polarity reversal sequence illustrated in FIG. 8, FIG. 9, and FIG. 10(a).

Figure 12:
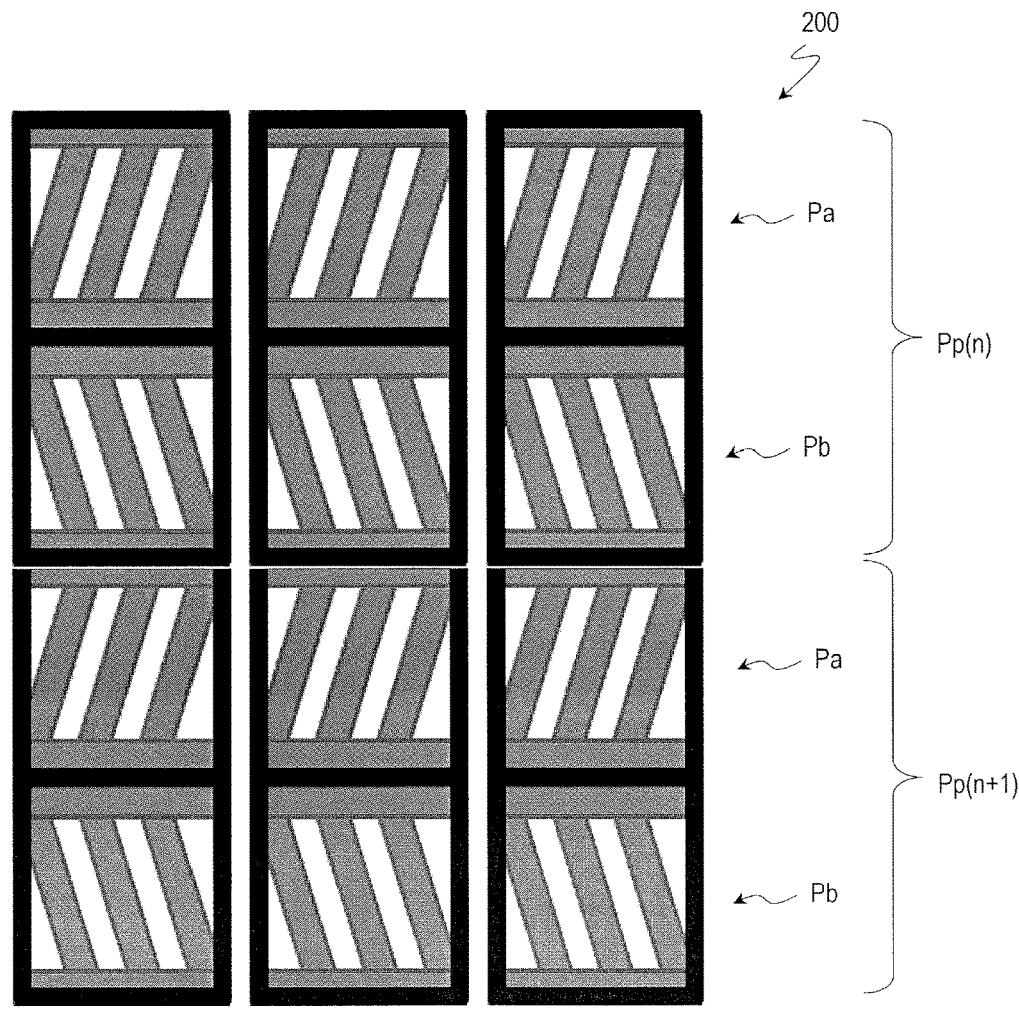
FIG. 12 A diagram schematically showing a pixel structure of a liquid crystal display device 200 including a driving circuit which is configured to perform a polarity reversal refresh operation in a 2H reversal mode.

FIG. 12 schematically shows a pixel structure of a liquid crystal display device 200 including a driving circuit which is configured to perform a polarity reversal refresh operation in a 2H reversal mode. The driving circuit of the liquid crystal display device 200 is capable of performing the polarity reversal sequence illustrated in FIG. 11.

The liquid crystal display device 200 is an FFS mode liquid crystal display device which has a pseudo dual domain structure. The plurality of pixels in the liquid crystal display device 200 include two types of pixels which have different electrode structures, pixels Pa and pixels Pb. Between the pixels Pa and the pixels Pb, for example, as illustrated herein, the directions in which the linear portions (or slits) of the pixel electrodes extend are different from each other. When a voltage is applied to the pixels Pa and the pixels Pb, liquid crystal molecules rotate in different directions, so that two types of liquid crystal domains are formed in which the directors intersect with each other. These two types of liquid crystal domains mutually compensate for the retardations, so that a color shift which occurs due to the viewing angle can be suppressed. While a structure where two types of liquid crystal domains are formed in a single pixel is referred to as a dual domain structure, a structure where two adjoining pixels form two types of liquid crystal domains is referred to as a pseudo dual domain structure. The pseudo dual domain structure is suitably applicable to high-definition liquid crystal display devices for use in mobile devices which include small pixels. An FFS mode liquid crystal display device which has a pseudo dual domain structure is disclosed in, for example, Japanese Laid-Open Patent Publication No. 2009-237414. Meanwhile, Japanese Laid-Open Patent Publication No. 2000-29072 discloses an IPS mode liquid crystal display device which has a pseudo dual domain. The entire disclosures of Japanese Laid-Open Patent Publication No. 2009-237414 and Japanese Laid-Open Patent Publication No. 2000-29072 are incorporated by reference in this specification.

In the liquid crystal display device 200, pixel rows consisting of only pixels Pa and pixel rows consisting of only pixels Pb which are adjacent to the rows of pixels Pa alternately occur in the column direction. Assuming that an odd-numbered row and an even-numbered row adjoining each other form a single pair (Pp), the plurality of pixels consist of odd-numbered pairs (e.g., Pp(n)) and even-numbered pairs (e.g., Pp(n+1)), and the odd-numbered pairs and the even-numbered pairs alternately occur in the column direction. Here, n is a positive integer. For example, in FIG. 12, when n=1, the pair Pp(1) consists of the pixels Pa of the first row and the pixels Pb of the second row, and the pair Pp(2) consists of the pixels Pa of the third row and the pixels Pb of the fourth row. Likewise, the pair Pp(3) consists of the pixels Pa of the fifth row and the pixels Pb of the sixth row, and the pair Pp(4) consists of the pixels Pa of the seventh row and the pixels Pb of the eighth row.

Thus, by replacing each row (1H) in the driving methods described with reference to FIG. 7 to FIG. 10, in which the polarity reversal refresh operation is performed in a 1H reversal mode, with a pair (a pair of pixel rows: 2H), they can be converted to driving methods in which the polarity reversal refresh operation is performed in a 2H reversal mode.

For example, when each row of Frame D of FIG. 7(a) is replaced with a pair of pixel rows, Frame A(=E) of FIG. 11 is obtained. When each row of Frame C of FIG. 7(a) is replaced with a pair of pixel rows, Frame B of FIG. 11 is obtained. When each row of Frame B of FIG. 7(a) is replaced with a pair of pixel rows, Frame C of FIG. 11 is obtained. When each row of Frame A(=E) of FIG. 7(a) is replaced with a pair of pixel rows, Frame D of FIG. 11 is obtained.

As clearly appreciated from the foregoing descriptions, a liquid crystal display device according to an embodiment of the present invention may be configured to perform a polarity reversal refresh operation in a 1H reversal mode or may be configured to perform a polarity reversal refresh operation in a 2H reversal mode.

In FFS mode liquid crystal display devices and IPS mode liquid crystal display devices which have the pseudo dual domain structure described herein, two types of pixels which have different electrode structures are arranged so as to adjoin one another in the column direction. The different electrode structures mean that the optimum counter voltage can also differ. Therefore, by realizing polarity reversal by the unit of two rows including two types of pixels, flickers caused by a shift in the counter voltage which is attributed to the difference in the pixel structure can be effectively suppressed.

Although 1 Hz has been illustrated as an example of the intermittent driving, the intermittent driving carried out by a liquid crystal display device according to an embodiment of the present invention is not limited to this example. The pause period only needs to be longer than the frame period, and the above-described effects are achieved in intermittent driving at a frame frequency lower than 60 Hz. Although the flexoelectric effect is profound in a FFS mode liquid crystal display device in which a nematic liquid crystal material of positive dielectric anisotropy is used, flickers are unlikely to be perceived also in a FFS mode liquid crystal display device in which a nematic liquid crystal material of negative dielectric anisotropy is used. As in the above-described embodiment, by applying the above-described driving method to a FFS mode liquid crystal display device in which a mixture of a positive liquid crystal material and a negative liquid crystal material is used, the flicker rate in intermittent driving at a frequency lower than 60 Hz (e.g., not more than 30 Hz, particularly not more than 10 Hz) can be greatly reduced.

A liquid crystal display device according to an embodiment of the present invention is, as a matter of course, capable of not only the above-described intermittent driving but also normal driving (frame frequency: 60 Hz). The frame frequency in the normal driving may be higher than 60 Hz, although such a high frequency is not preferred because the power consumption increases as the frame frequency increases.

A liquid crystal display device according to the above-described embodiment includes not only a liquid crystal layer which contains a positive liquid crystal material and a negative liquid crystal material in a predetermined proportion as described above but also a display region including a plurality of pixels arranged in a matrix of rows and columns, each pixel including first and second electrodes capable of generating a transverse electric field across the liquid crystal layer, and a driving circuit for supplying a pixel voltage to each of the plurality of pixels wherein, where a time interval equivalent to a frame period which is determined according to the input video signal is referred to as "refresh period", the driving circuit may be configured to perform: a first polarity reversal refresh operation in the first refresh period such that, of the plurality of pixels, only pixels of odd-numbered or even-numbered rows are each supplied with a pixel voltage whose polarity is opposite to that of the voltage held in that pixel or such that, of the pixels of a plurality of pairs of adjoining rows (each pair consisting of an odd-numbered row and an even-numbered row adjoining each other), only pixels of even-numbered pairs or odd-numbered pairs are each supplied with a pixel voltage whose polarity is opposite to that of the voltage held in that pixel; a pause operation in a pause period which follows the first refresh period, and which is longer than the refresh period, such that none of the plurality of pixels is supplied with a pixel voltage; and a second polarity reversal refresh operation in the second refresh period immediately subsequent to the pause period such that only pixels of even-numbered or odd-numbered rows, or only pixels of even-numbered or odd-numbered pairs, which have not been supplied with a pixel voltage of the opposite polarity by the first polarity reversal refresh operation are each supplied with a pixel voltage whose polarity is opposite to that of the voltage held in that pixel.

INDUSTRIAL APPLICABILITY

A liquid crystal display device according to an embodiment of the present invention is applicable to a wide variety of display devices and electronic devices, such as television sets, monitors, displays for mobile terminals, etc.

REFERENCE SIGNS LIST

10 TFT substrate (first substrate)
11 substrate
12 gate metal layer
13 gate insulating layer
14 oxide semiconductor layer
16 source metal layer
17 interlayer insulating layer
22 counter electrode (second electrode)
23 dielectric layer
24 pixel electrode (first electrode)
24s linear portion
25 first alignment film
30 counter substrate (second substrate)
31 substrate

The invention claimed is:
1. A liquid crystal display device, comprising:
a pair of substrates;
a liquid crystal layer held between the pair of substrates, the liquid crystal layer containing one or more types of positive liquid crystal compounds whose dielectric anisotropy is positive and one or more types of negative liquid crystal compounds whose dielectric anisotropy is negative, a total content of the positive liquid crystal compounds not being smaller than a total content of the negative liquid crystal compounds; and
a pixel electrode and a common electrode provided in one of the pair of substrates, the pixel electrode having a plurality of linear portions and a slit provided between adjoining two of the plurality of linear portions, the common electrode being insulated from the pixel electrode, wherein
the pixel electrode and the common electrode apply across the liquid crystal layer a pixel voltage of positive polarity and a pixel voltage of negative polarity alternately at a frequency lower than 60 Hz;
a liquid crystal material which contains the positive liquid crystal compound but does not contain the negative liquid crystal compound is such a positive liquid crystal material that, when a positive polarity voltage and a negative polarity voltage which have substantially equal absolute values are applied alternately, a luminance over the slit decreases at a first decrease rate from a stable luminance achieved during application of the positive polarity voltage to a luminance achieved in a state where a luminance of an entire pixel is temporarily decreased and decreases at a second decrease rate from a luminance achieved in a state where a luminance of an entire pixel is temporarily decreased to a stable luminance achieved during application of the negative polarity voltage, while a luminance over the plurality of linear portions increases at a first increase rate from a stable luminance achieved during application of the positive polarity voltage to a luminance achieved in a state where a luminance of an entire pixel is temporarily decreased and increases at a second increase rate from a luminance achieved in a state where a luminance of an entire pixel is temporarily decreased to a stable luminance achieved during application of the negative polarity voltage;

a liquid crystal material which contains the negative liquid crystal compound but does not contain the positive liquid crystal compound is such a negative liquid crystal material that, when a positive polarity voltage and a negative polarity voltage which have substantially equal absolute values are applied alternately, a luminance over the slit increases at a third increase rate from a stable luminance achieved during application of the positive polarity voltage to a luminance achieved in a state where a luminance of an entire pixel is temporarily decreased and increases at a fourth increase rate from a luminance achieved in a state where a luminance of an entire pixel is temporarily decreased to a stable luminance achieved during application of the negative polarity voltage, while a luminance over the plurality of linear portions decreases at a third decrease rate from a stable luminance achieved during application of the positive polarity voltage to a luminance achieved in a state where a luminance of an entire pixel is temporarily decreased and decreases at a fourth decrease rate from a luminance achieved in a state where a luminance of an entire pixel is temporarily decreased to a stable luminance achieved during application of the negative polarity voltage; and a difference in magnitude between the second decrease rate and the second increase rate for the positive liquid crystal material is greater than a difference in magnitude between the fourth increase rate and the fourth decrease rate for the negative liquid crystal material.

2. The liquid crystal display device of claim 1, wherein the pixel voltage of positive polarity and the pixel voltage of negative polarity are applied alternately at a frequency of 30 Hz or lower across the liquid crystal layer.

3. The liquid crystal display device of claim 2, wherein the pixel voltage of positive polarity and the pixel voltage of negative polarity are applied alternately at a frequency of 10 Hz or lower across the liquid crystal layer.

4. The liquid crystal display device of claim 1, wherein a flicker rate achieved when a liquid crystal display device using a negative liquid crystal material which contains the negative liquid crystal compound but does not contain the positive liquid crystal compound is driven at 1 Hz is lower than a flicker rate achieved when a liquid crystal display device using a positive liquid crystal material which contains the positive liquid crystal compound but does not contain the negative liquid crystal compound is driven at the predetermined frequency.

5. The liquid crystal display device of claim 1, wherein the liquid crystal layer contains the negative liquid crystal compound in a proportion of not less than 2 volume % and not more than 30 volume %.

6. The liquid crystal display device of claim 5, wherein the liquid crystal layer contains the negative liquid crystal compound in a proportion of not less than 2 volume % and not more than 15 volume %.

7. The liquid crystal display device of claim 1, wherein the first decrease rate over the slit in the positive liquid crystal material is greater than the second decrease rate.

8. The liquid crystal display device of claim 7, wherein a difference between the third increase rate and the fourth increase rate over the slit in the negative liquid crystal material is smaller than a difference between the first decrease rate and the second decrease rate in the positive liquid crystal material.

9. A liquid crystal display device, comprising:
a pair of substrates;
a liquid crystal layer held between the pair of substrates, the liquid crystal layer containing one or more types of positive liquid crystal compounds whose dielectric anisotropy is positive and one or more types of negative liquid crystal compounds whose dielectric anisotropy is negative, a total content of the positive liquid crystal compounds not being smaller than a total content of the negative liquid crystal compounds; and
a pixel electrode and a common electrode provided in one of the pair of substrates, the pixel electrode having a plurality of linear portions and a slit provided between adjoining two of the plurality of linear portions, the common electrode being insulated from the pixel electrode, wherein the pixel electrode and the common electrode apply across the liquid crystal layer a pixel voltage of positive polarity and a pixel voltage of negative polarity alternately at a frequency lower than 60 Hz, when a positive polarity voltage and a negative polarity voltage which have substantially equal absolute values are applied alternately and a stable luminance of an entire pixel achieved during application of the positive polarity voltage and a stable luminance of an entire pixel achieved during application of the negative polarity voltage are substantially equal to each other, a temporary decrease occurs in the luminance of the entire pixel from the stable luminance of the entire pixel in a predetermined period immediately after the polarity is switched, the positive liquid crystal compound includes such a liquid crystal compound that, over the slit, a first difference is greater than a second difference, the first difference being a difference between a stable luminance achieved during application of the positive polarity voltage and a luminance achieved when the temporary decrease occurs in the luminance of the entire pixel, the second difference being a difference between a luminance achieved when the temporary decrease occurs in the luminance of the entire pixel and a stable luminance achieved during application of the negative polarity voltage, and the negative liquid crystal material includes such a liquid crystal compound that, over the slit, a difference between a third difference and a fourth difference is smaller than a difference between the first difference and the second difference, the third difference being a difference between a stable luminance achieved during application of the positive polarity voltage and a luminance achieved when the temporary decrease occurs in the luminance of the entire pixel, and the fourth difference being a difference between a luminance achieved when the temporary decrease occurs in the luminance of the entire pixel and a stable luminance achieved during application of the negative polarity voltage.

10. The liquid crystal display device of claim 9, further comprising a thin film transistor coupled with the pixel electrode,
wherein an active layer of the thin film transistor includes an oxide semiconductor layer.

11. The liquid crystal display device of claim 10, wherein the oxide semiconductor layer includes an In—Ga—Zn—O based semiconductor layer.

12. The liquid crystal display device of claim 11, wherein the In—Ga—Zn—O based semiconductor layer includes a crystalline portion.

13. The liquid crystal display device of claim 9, wherein the pixel voltage of positive polarity and the pixel voltage of negative polarity are applied alternately at a frequency of 30 Hz or lower across the liquid crystal layer.

14. The liquid crystal display device of claim 13, wherein the pixel voltage of positive polarity and the pixel voltage of negative polarity are applied alternately at a frequency of 10 Hz or lower across the liquid crystal layer.

15. The liquid crystal display device of claim 9, wherein a flicker rate achieved when a liquid crystal display device using a negative liquid crystal material which contains the negative liquid crystal compound but does not contain the positive liquid crystal compound is driven at 1 Hz is lower than a flicker rate achieved when a liquid crystal display device using a positive liquid crystal material which contains the positive liquid crystal compound but does not contain the negative liquid crystal compound is driven at the predetermined frequency.

16. The liquid crystal display device of claim 9, wherein the liquid crystal layer contains the negative liquid crystal compound in a proportion of not less than 2 volume % and not more than 30 volume %.

17. The liquid crystal display device of claim 16, wherein the liquid crystal layer contains the negative liquid crystal compound in a proportion of not less than 2 volume % and not more than 15 volume %.

* * * * *